US006633297B2

(12) United States Patent
McCormack et al.

(10) Patent No.: US 6,633,297 B2
(45) Date of Patent: Oct. 14, 2003

(54) SYSTEM AND METHOD FOR PRODUCING AN ANTIALIASED IMAGE USING A MERGE BUFFER

(75) Inventors: Joel James McCormack, Boulder, CO (US); Keith Istvan Farkas, San Carlos, CA (US); Norman P. Jouppi, Palo Alto, CA (US); Larry Dean Seiler, Boylston, MA (US); Robert Stephen McNamara, Portola Valley, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 201 days.

(21) Appl. No.: 09/934,282

(22) Filed: Aug. 20, 2001

(65) Prior Publication Data

US 2002/0097241 A1 Jul. 25, 2002

Related U.S. Application Data

(60) Provisional application No. 60/226,500, filed on Aug. 18, 2000.

(51) Int. Cl.[7] .................................................. G06T 1/20
(52) U.S. Cl. ........................ 345/506; 345/419; 345/421; 345/423; 345/629; 345/582
(58) Field of Search ................................. 345/506, 505, 345/503, 419, 421, 423, 619, 629, 582

(56) References Cited

U.S. PATENT DOCUMENTS 5,854,631 A   12/1998  Akeley et al. .............. 345/419
6,204,859 B1 * 3/2001  Jouppi et al. ............... 345/592
6,362,828 B1 * 3/2002  Morgan ....................... 345/582
6,456,291 B1 * 9/2002  Fowler ........................ 345/582

OTHER PUBLICATIONS

Seung–Gi Lee et al disclosed: The Design Of The Perspective Texture Mapping for 3D Computer Graphics in a Rasterizer Merged Frame Buffer Technology (2000 IEEE).*
Tosiyasu L. Kunii et al disclosed: Parallel Polygon Rendering On The Graphics Computer VC–1 (1995 IEEE).*
Carpenter, L., "The A–Buffer, an Antialiased Hidden Surface Method," *Computer Graphics* (Jul. 1984) vol. 18(3): 103–108.

* cited by examiner

*Primary Examiner*—Matthew C. Bella
*Assistant Examiner*—Mackly Monestime

(57) ABSTRACT

In a graphics pipeline, a rasterizer circuit generates fragments for an image having multiple surfaces that have been tessellated into primitive objects, such as triangles. First and second fragments are associated with the same pixel. A merge buffer merges the first fragment with the second fragment when the two fragments belong to the same tessellated surface, the first fragment's primitive is adjacent to the second fragment's primitive, both fragments face either toward or away from the viewer, and the first and second fragment are sufficiently similar that merging is unlikely to introduce visually objectionable artifacts. A frame buffer receives fragments from the merge buffer, stores the fragments, combines the fragments into pixels, and outputs the pixels to a display.

71 Claims, 19 Drawing Sheets

Merge Buffer Block Diagram

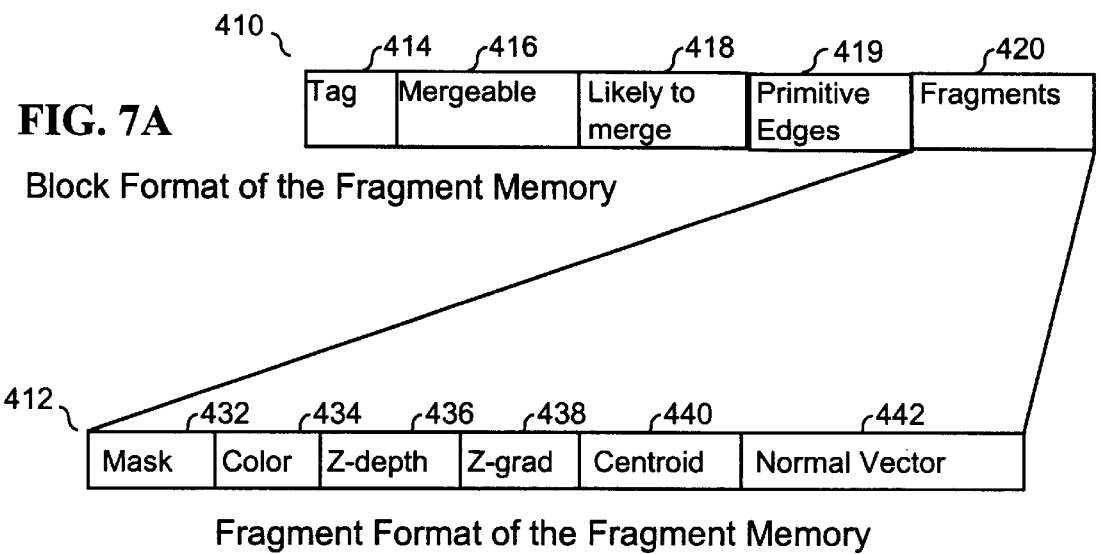
FIG. 7A
Block Format of the Fragment Memory
Fragment Format of the Fragment Memory
FIG. 7C
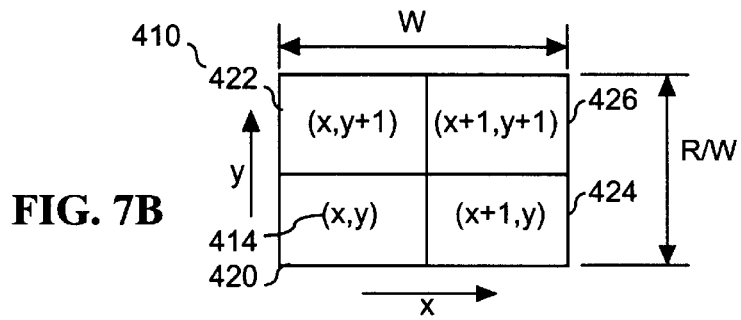
FIG. 7B
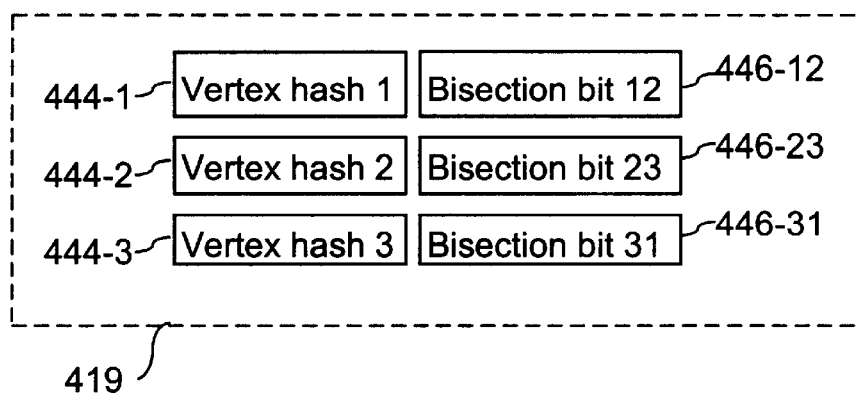
FIG. 7D

Merge Buffer Pipeline

Color Value Merge Circuit 1

Color Value Merge Circuit 2

Mask Comparison Circuit

Hardware for Determination of Depth Similarity

Determination of Color Similarity

SYSTEM AND METHOD FOR PRODUCING AN ANTIALIASED IMAGE USING A MERGE BUFFER

This application claims priority on U.S. provisional patent application 60/226,500, filed Aug. 18, 2000.

The present invention relates generally to computer graphics, and more particularly to a system and method for reducing memory and processing bandwidth requirements of a computer graphics system by using a buffer in a graphics pipeline to merge selected image fragments before they reach a frame buffer.

BACKGROUND OF THE INVENTION

Many computer graphics systems use pixels to define images. The pixels are arranged on a display screen, such as a raster display, as a rectangular array of points. Two-dimensional (2D) and three-dimensional (3D) scenes are drawn on the display by selecting the light intensity and the color of each of the display's pixels; such drawing is referred to as rendering.

Rendering a scene has many steps. One rendering step is rasterization. A scene is made up of objects. For example, in a scene of a kitchen, the objects include a refrigerator, counters, stove, etc. Rasterization is a process by which the following is determined for each object in the scene: (1) identifyng the subset of the display's pixels that are contained within the object, and then for each pixel in this subset, (2) identifying the information that is later used to determine the color and intensity to assign to each pixel. Rasterization of an object generates a fragment for each pixel the object either fully or partially covers, and the information identified in (2) above is called fragment data.

A scene may be composed of arbitrarily complex objects. Before rendering such a scene by a computer system, a process called tessellation decomposes the complex objects into simpler (primitive), planar objects. Typically, systems decompose the complex objects into triangles. For example, polygons with four or more vertices are decomposed into two or more triangles. Curved surfaces, such as on a sphere, are also approximated by a set of triangles. These triangles are then are then rasterized. Though with minor modifications the invention could work with primitives with more sides, for example, quadrilaterals, hereafter we assume that all surfaces are tessellated into triangles. "Primitives" with more sides will only arise as a consequence of merging fragments from two or more triangles.

In FIG. 1, a tessellated surface 30 has three primitive objects—triangle one 32-1, triangle two 32-2 and triangle three 32-3. The edges of the tessellated surface 30 are depicted with wide lines. To illustrate the rasterization process, the tessellated surface 30 is superimposed on an exemplary pixel grid 40. Each pixel 42 of the pixel grid 40 is represented by a square. The rasterization process generates a fragment for each primitive object that is superimposed on a pixel 42.

In the rasterization process, a finite array of discrete points, each point representing the center of a pixel of the display device, is used to construct a regular grid, for example the pixel grid 40. To construct such a grid, a filter kernel is placed over each of the discrete points. The two-dimensional bounding shape of the portion of the filter that has non-zero weight is sometimes called the support in signal processing theory, but is commonly referred to as the footprint. In the general case, the filter footprints of neighboring pixels overlap each other and thus intersect.

Typically, hardware-based rasterizers use filter footprints that are 1×1 pixel squares and thus do not overlap. Such a filter was used to create pixel grid 40. Each square in pixel grid 40 is the filter footprint of a 1×1 pixel square filter placed over the discrete pixel point at the center of the square. This pixel grid 40 is used to generate fragments.

The fragments of an object are obtained by projecting the object onto the pixel grid. A fragment is then generated for a given pixel if the footprint of the filter located over the pixel intersects the object. To illustrate the rasterization process, rasterization of the three triangles 32 yields a number of fragments for each triangle 32. Within each pixel 42, the number enclosed by a circle is the number of fragments that are generated for that pixel on behalf of one or more primitive objects. For example, since tessellated surface 30 does not cover pixel 42-1, no fragments are associated with pixel 42-1. Since triangle 32-2 partially covers pixel 42-2, one fragment 44 is associated with pixel 42-2. Since all three triangles 32-1, 32-2 and 32-3 partially cover pixel 42-3, three fragments 46 are generated for pixel 42-3. Because none of the three fragments 46-1, 46-2, 46-3 fully cover pixel 42-3, pixel 42-3 is displayed with a color that is a combination of the three fragments 46-1, 46-2, 46-3 and the background color.

The grid 40 depicts the filter footprints obtained by locating a filter with a 1×1 pixel square footprint over each pixel center in the pixel grid. For example, square 48 in grid 40 represents the footprint of the filter that is centered over the point in the pixel grid that corresponds to pixel 50. The color and intensity of a fragment is obtained by sampling the object's color and intensity at each point of intersection with the pixel's filter footprint, weighing each sample by the value of the filter at the corresponding point, and accumulating the results.

After rasterization, texture mapping is typically applied. Texture mapping is a technique for shading surfaces of objects with texture patterns, thereby increasing the realism of the scene being rendered. Texture mapping is applied to the fragments that correspond to objects for which texture mapping has been specified by the person who designed the scene. Texture mapping results in color information that is either combined with the existing color information for the fragment or replaces this data.

Once the color information is known for a fragment, the frame buffer is updated. In this step, each newly-generated fragment is either added to or blended with previously-generated fragments that correspond to the same pixel. The frame buffer stores up to N fragments per pixel, where N is greater than or equal to one. When a new fragment f is generated for a pixel P, the frame buffer replaces one of pixel P's existing fragments with the new fragment f, blends fragment f with one of the existing fragments, or stores fragment f with the existing fragments if fewer than N fragments are currently stored. In such systems, the displayed color of a pixel is obtained by blending together the new fragment f with up to N stored fragments.

Because rasterization of a scene typically yields many fragments for each pixel, the texture-mapping stage and frame buffer often process multiple fragments for the same pixel. In many cases, fragments from two or more adjoining triangles that cover the same pixel may have nearly identical color and depth values because the fragments belong to the same tessellated surface.

Artifacts are distortions in the displayed image. One source of artifacts is aliasing. Aliasing occurs because the pixels are sampled and therefore have a discrete nature.

Artifacts can appear when an entire pixel is given a light intensity or color based upon an insufficient sample of points within that pixel. To reduce aliasing effects in images, the pixels can be sampled at subpixel locations within the pixel. Each of the subpixel sample locations contributes color data that can be used to generate the composite color of that pixel.

As shown in FIG. 2, the filter is typically evaluated at a predefined number of discrete points 56 within the footprint. Typically, from four to thirty-two sample points are used. In one approach to sampling, sparse supersampling, these points are "staggered" on a fine grid. For example, the filter for the pixel 50 is sampled at four points 56, labeled S1, S2, S3, and S4, chosen from a 4×4 array 60 aligned to the center 62 of the pixel 50. The term coverage mask refers to the data that records, for the sample points 56 associated with pixel 50, whether each sample point is inside or outside of the object being rendered. An object is said to fully cover a pixel if all of the sample points for the pixel are inside the object; otherwise the object is said to partially cover the pixel if at least one sample point is inside the object.

Careful examination of a supersampled pixel reveals that the color and depth values at different sample points within a pixel usually differ little from each other, as long as the sample points belong to the same surface. For example, if a pixel is completely covered by a surface, then most of the color and depth values are likely to be fairly similar. This similarity usually holds true even when different sample points belong to different primitives (triangles) of the same tessellated surface.

If a graphics accelerator processes multiple sample points for a single fragment en masse, then it is inefficient to process multiple fragments for a single pixel, when the fragments belong to a single surface that has been tessellated into multiple primitive objects. Therefore, to reduce the memory and processing bandwidth requirements of a graphics accelerator (or equivalently to reduce the amount of processing required to render an object), a method and apparatus are needed that merges fragments from adjoining primitive objects of a tessellated surface that cover the same pixel.

SUMMARY OF THE INVENTION

In a graphics pipeline, a rasterizer circuit generates fragments for an image having multiple surfaces that have been tessellated into primitive objects, such as triangles. First and second fragments are associated with the same pixel. A merge buffer merges the first fragment with the second fragment when the two fragments belong to the same tessellated surface, the first fragment's primitive is adjacent to the second fragment's primitive, both fragments face either toward or away from the viewer, and the first and second fragment are sufficiently similar that merging is unlikely to introduce visually objectionable artifacts. A frame buffer receives fragments from the merge buffer, stores the fragments, combines the fragments into pixels, and outputs the pixels to a display.

In a particular embodiment, in a graphics pipeline, a rasterizer circuit generates fragments for an image having a tessellated surface. First and second fragments are associated with the same pixel and are also associated with the tessellated surface. Each fragment has an associated depth value and color information. A merge buffer merges the first fragment with the second fragment when the following four criteria are met: (1) the first and second fragments are generated sufficiently close in time, (2) the first fragment's primitive is adjacent to (shares an edge with) the second fragment's primitive in 3D space, (3) the first and second fragments' primitives are oriented similarly in 3D space, and (4) the depth value and color of the first and second fragments are sufficiently similar. This merged fragment may then merge with subsequent fragments if these criteria are again met. A frame buffer receives fragments from the merge buffer, some of which may have been merged; performs a depth test; stores the resulting visible fragments; combines color, transparency, and depth information from all fragments associated with each pixel into a (red, green, blue, alpha transparency) quadruplet; and outputs the quadruplets to a display.

In another aspect of the invention, the merge buffer has a fragment storage storing up to a predetermined number of fragment tuples. Each stored fragment tuple is associated with a fragment. It should be noted that when a fragment is in the merge buffer, the graphics accelerator does not yet know if the fragment will be visible. Each fragment tuple includes a coverage mask, color value, depth (Z) value, and a pair of depth gradient (Z gradient) values. The fragment tuples are also associated with an x-y position tag. A merge pipeline processing circuit processes a new fragment tuple representing a fragment to be added to the pixel. The pipeline processing circuit includes a sequence of pipeline stage circuits. A comparison stage compares an x-y position tag of a new fragment tuple with the x-y position tags of the fragment tuples in the fragment storage and identifies a potentially mergable existing fragment tuple based on a result of the comparison. An evaluation stage compares coverage masks, primitive edges, surface normal vectors, Z values, and color, or a subset thereof, to determine if the new fragment tuple should actually be merged with the potentially mergable fragment tuple. A fragment merging stage merges the color value, the Z value and the pair of Z gradient values of the new fragment tuple and the potentially mergable fragment tuple to generate a merged fragment tuple based on the outcomes of the evaluation stage. An update fragment storage stage stores the merged fragment in the fragment storage.

Merging fragments in the merge buffer increases the rendering speed by reducing the number of fragments sent to the frame buffer to add or merge with a pixel's existing fragments. This in turn also reduces the amount of work required by the frame buffer to add or merge a new fragment with a pixel's existing fragments, by decreasing the average number of fragments stored with each pixel. The present invention merges fragments within a pixel from the same surface before the fragments reach the frame buffer. Each time a first and second fragment are merged, the invention avoids both writing the first fragment to the frame buffer, and subsequently reading the first fragment from the frame buffer. Therefore merging fragments in a merge buffer before the fragments reach the frame buffer significantly reduces frame buffer memory bandwidth requirements. This in turn increases the speed of the rendering process for a given amount of memory bandwidth. Alternatively, fewer or less expensive memory chips with less bandwidth may be used. Because fragments are merged, the amount of memory for storing the fragment information, including the subpixel information, may also be reduced. In addition, the present invention employs heuristics that decrease the likelihood that merging will introduce noticeable artifacts.

BRIEF DESCRIPTION OF THE DRAWINGS

Additional objects and features of the invention will be more readily apparent from the following detailed description and appended claims when taken in conjunction with the drawings, in which:

FIG. 7A is a diagram of a block format of a block of fragments of FIG. 6;

FIG. 7B is a diagram of a block with four fragments with their tags;

FIG. 7C is a diagram of the fragment format of the block of FIG. 7A;

FIG. 7D is a diagram of the primitive edge format of the block of FIG. 7A;

DESCRIPTION OF THE PREFERRED EMBODIMENTS

The following embodiments of the present invention will be described in the context of a graphics accelerator used in conjunction with a computer system to display graphical images on a computer screen; however, those skilled in the art will recognize that the disclosed systems and methods are readily adaptable for broader application. For example, without limitation, the present invention could be readily applied in the context of a printer.

The present invention enables a computer graphics system to render high-quality, antialiased images using a reduced amount of memory bandwidth and processing bandwidth. The present invention includes a buffer in the graphics pipeline that merges fragments belonging to the same tessellated surface prior to sending them to the frame buffer for further processing and display. As a result, the memory bandwidth and processing requirements of the frame buffer are reduced, thus allowing high quality images to be generated more economically.

System Overview

Figure 3:
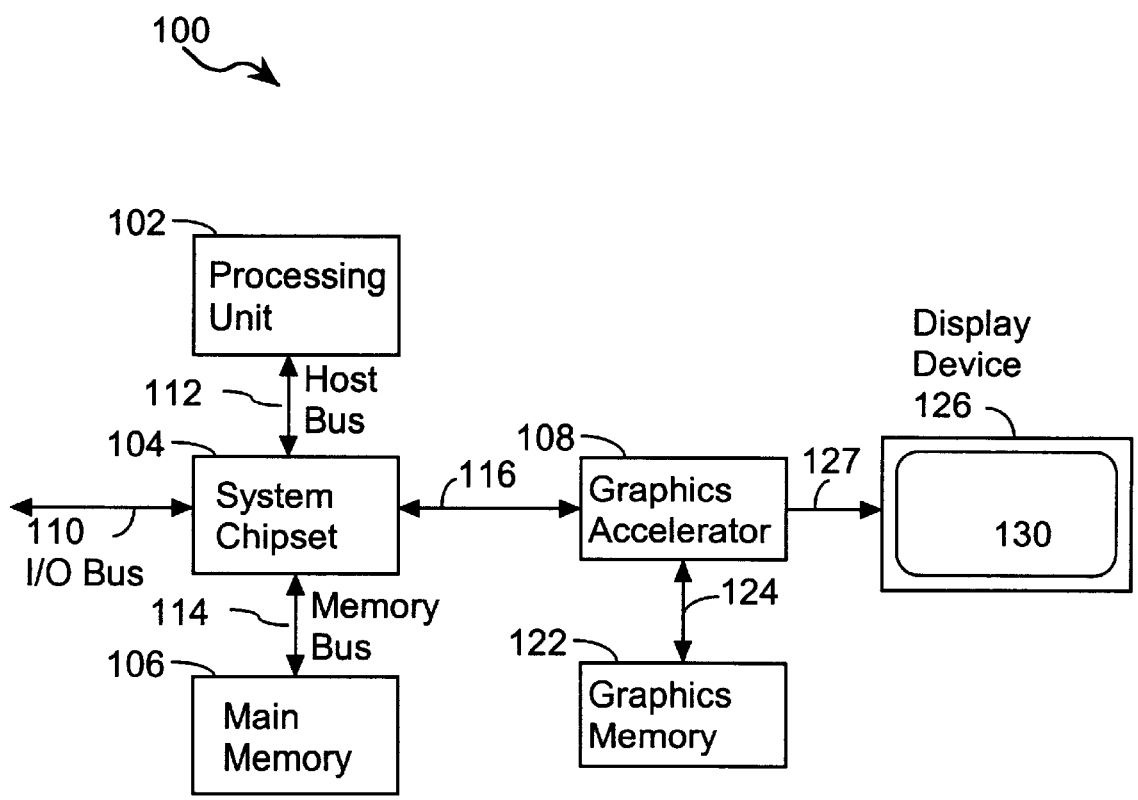
FIG. 3 is a block diagram of an exemplary computer graphics system that can be used to practice the invention.

FIG. 3 shows a computer system 100 that can generate monochrome or multicolor 2-dimensional (2D) and 3-dimensional (3D) graphic images for display according to the principles of the present invention. The computer system 100 can be any of a wide variety of data processing systems including, for example, a personal computer, a workstation, or a mainframe.

In the computer system 100, a system chipset 104 may provide an interface among a processing unit 102, a main memory 106, a graphics accelerator 108 and devices (not shown) on an I/O bus 110. The processing unit 102 is coupled to the system chipset 104 by the host bus 112 and includes one or more central processing units (CPU's). The main memory 106 interfaces to the system chipset 104 by bus 114.

The graphics accelerator 108 is coupled to the system chipset 104 by a bus 116, by which the graphics accelerator 108 can receive graphics commands to render graphical images. A graphics memory 122 and a display device 126 are coupled to the graphics accelerator 108; the graphics memory 122 is coupled by bus 124, and the display device 126, by bus 127. The display device 126 preferably produces color images, but the invention can also be practiced with a monochrome monitor to display grayscale images or with printers that print black and white or color images.

An image appears on the display by illuminating a particular pattern of individual points called pixels. While the image rendered may be two dimensional (2D) or three dimensional (3D), the display device itself generally includes a two-dimensional array of pixels. The array size of display screens can vary widely. Examples of display screen sizes include 1024×768 and 1920×1200 pixels. For the purposes of practicing the invention, the display device 126 may be any suitable pixel-based display, such as a CRT (cathode ray tube), liquid-crystal display, laser printer, or ink-jet printer.

The graphics memory 122 includes storage elements for storing an encoded version of the graphical image to be displayed. There is a direct correspondence between the storage elements and each pixel on the display screen 130.

The storage elements are allocated to store data representing each pixel, hereafter referred to as pixel data. For example, five bytes may be used to encode a color representation for each pixel.

The values stored in the storage elements for a particular pixel controls the color of the particular pixel on the screen 130. The "color" of a pixel includes its brightness or intensity. There are many different ways of representing color information, including direct color value representations and indirect representations in which the stored pixel data are indices used to access a color lookup table. The present invention is applicable to systems using any pixel representation method.

During operation, the computer system 100 can issue graphics commands that request an object to be displayed. The graphics accelerator 108 executes the graphics commands, converting the object into primitives and then into fragments. Alternately, processing unit 102 converts the object into primitives, and the graphics accelerator 108 converts the primitives into fragments. A primitive is a graphical structure, such as a line, a triangle, a circle, or a surface patch of a solid shape, which can be used to build more complex structures. A fragment is a two-dimensional polygon created by clipping a primitive, such as a line, triangle, or circle, to the boundaries of the pixel. A more detailed description of fragments is provided by Loren Carpenter in "The A-buffer, an Antialiased Hidden Surface Method", Computer Graphics Vol. 18, No. 3, 1984, pp. 103–107, incorporated by reference herein as background information.

The graphics accelerator 108 renders the fragments, and loads the pixel data corresponding to the fragments into the appropriate storage elements of the graphics memory 122. Additionally, pixel data can be transferred into the graphics memory 122 from the main memory 106 via busses 114, 116, and 124, or from processing unit 102 via busses 112, 116, and 124.

To display the image, the pixel data are read out of the graphics memory 122 and rendered as illuminated points of color on the screen 130 of the display device 126.

Pixel Subsample Data Storage

Figure 4:
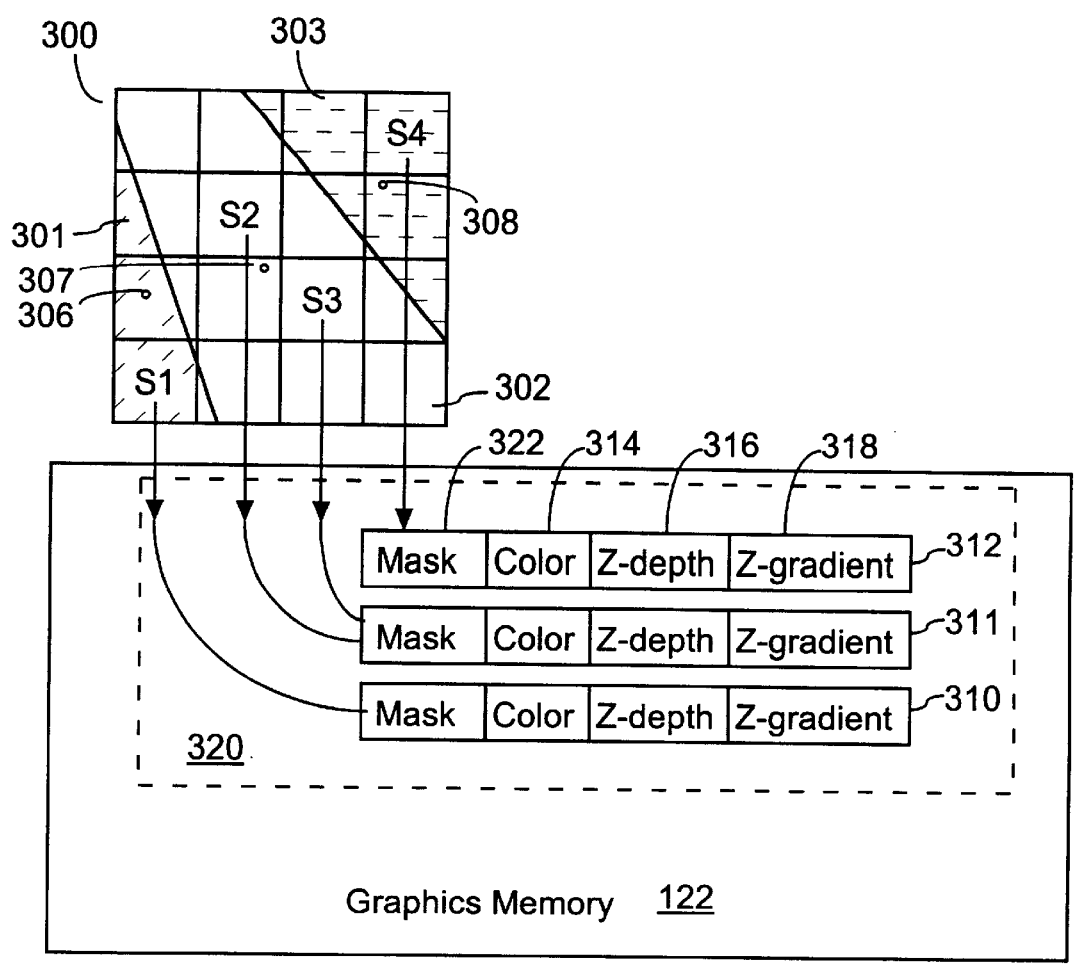
FIG. 4 illustrates data structures stored in a pixel memory representing a plurality of fragment tuples.

FIG. 4 shows an exemplary pixel 300 that is part of an image and is subdivided into a 4×4 subpixel array. The pixel 300 has four sampling positions S1, S2, S3, and S4. Pixel 300 is covered by three image fragments 301, 302, 303 from three different primitive objects (often herein called "primitives"). Each fragment 301, 302, 303 is associated with a fragment value, called a "fragment tuple," 310, 311, 312. For example, in FIG. 4, fragment tuple 310 is associated with fragment 301, fragment tuple 311 is associated with fragment 302 and fragment tuple 312 is associated with fragment 303.

Each fragment value includes a color value 314, a Z depth value 316, and Z gradient values 318. The color value 314 represents the color and opacity of the corresponding fragment at an approximation to the centroid of the fragment. The Z depth value 316 represents a Z coordinate value of the corresponding fragment along a Z axis that is perpendicular to the image. The Z coordinate is used to provide 3D depth. The Z gradient information, comprised of an x component and a y component, allow the reconstruction of the Z coordinate value at each of the sample points of the fragment.

In one embodiment, each fragment tuple uses five bytes of memory to represent the color 314, three bytes for the Z depth 316 and two bytes for the Z gradient 318. The five-byte color 314 field is used to store four 10-bit color parameters: Red, Green, Blue, and Alpha. These parameters are sometimes called "channels." The value stored in each RGB (Red, Green, Blue) channel indicates the intensity (or brightness) of that color channel. Low values correspond to low intensity, dark colors; high values correspond to high intensity, light colors. Various methods for producing the color combining the RGB values are well known in the art.

The opacity of the fragment is expressed by the value stored in the Alpha channel. For example, a 1.0 value (i.e., all 10 Alpha-channel bits are 1) indicates that the associated fragment is opaque, a 0.0 value indicates that the fragment is invisible, i.e., completely transparent, and values between 0.0 and 1.0 indicate degrees of transparency.

In general, a fragment does not have a single color value, as lighting models in common use allow the color to change, perhaps non-linearly, across the fragment. But since color values usually do not change much across a fragment, we use the color at a single point in the fragment to represent the color of the entire fragment. This point should be near the centroid of the fragment. The centroid of a fragment is the position of the fragment's center of mass. The center of mass can be thought of as the position at which the fragment would perfectly balance on a needle if you cut the fragment shape out of a piece of stiff paper. In FIG. 4, the point 306 is the centroid of fragment 301, the point 307 is the centroid of fragment 302, and the point 308 is the centroid of the fragment 303.

The approximation to the centroid can use a fairly simple computation. For example, the x offset of a fragment's centroid from the lower left corner of the pixel might be computed by adding the x offsets of all sample points within the fragment, then dividing by the number of sample points in the fragment. The y offset can be similarly computed. Though this is a crude approximation in the examples using four sample points, it is usually pretty accurate in an implementation using 16 sample points.

In general, a fragment does not have a single Z depth value, as the fragment's primitive is usually tilted with respect to the viewer. Unlike color values, representing the entire fragment with a single Z value leads to gross artifacts, as incorrectly computing which primitive is visible (nearer to the viewer) at several sample points may lead to large changes in the color of the pixel. Instead, Z values are computed at any point in the fragment using a planar (affine) equation of the form:

$$Z(x,y)=A(x-x_0)+B(y-y_0)+C$$

We choose the point ($x_0$, $y_0$) arbitrarily, for example the lower left corner of the pixel. Note that this arbitrary point may be outside a fragment's boundaries. For example, in FIG. 4 only the fragment 301 contains the lower left corner of the pixel.

In one embodiment the Z depth field 316 is a three-byte field that contains the fragment's Z value computed at ($x_0$, $y_0$); that is, the Z depth field 316 contains the value for the coefficient C in the planar equation. In this embodiment each Z gradient is a two-byte field that includes a one-byte x component and a one-byte Y component. The one-byte x component of the Z gradients 318 supplies an approximate value for the coefficient A; the one-byte y component of the Z gradients 318 supplies an approximate value for the coefficient B. These values are represented in a floating-point format with a 2-bit mantissa (with an implicit leading 1), and a 6-bit exponent. Thus, the Z value at the lower left corner of the pixel, in conjunction with the Z gradients, allow the computation of an approximate Z value at any sample point within the fragment. The number of bytes used for each field in the stored fragment and the particular data format of those fields may change from one implementation to another.

Figure 2:
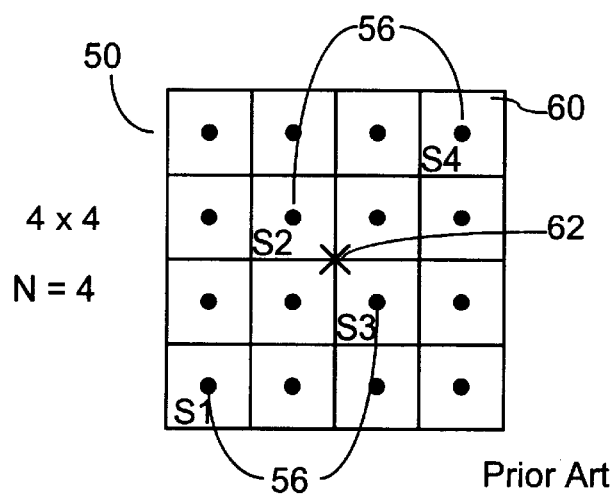
FIG. 2 represents a subdivision of a pixel of FIG. 1 into subpixels.

Memory is allocated to each pixel 50 (FIG. 2) for storing a predetermined number of fragment values, for storing a dynamic number of fragment values, or using other techniques well known in the art. This memory can be either graphics memory 122, as shown in FIG. 3, or main memory 106.

As shown in FIG. 4, each fragment tuple includes a coverage mask 322, with each bit of the mask indicating whether or not the fragment value applies to a corresponding one of the subpixel samples. Thus a fragment value with a coverage mask value of "1 0 0 0" corresponds to a fragment covering only subpixel S1, while a coverage mask value of "0 1 1 1" would indicate that the fragment value corresponds to a fragment covering subpixels S2, S3 and S4.

When rendering images having transparent or partially transparent fragments, the fragments for a pixel may have overlapping coverage masks. For example, one fragment might have a coverage mask of "0 1 1 1" while another fragment might have a coverage mask of "0 0 0 1"—indicating that both fragments cover subpixel S4. The nearer fragment must be partially transparent, so that the farther fragment is visible at subpixel S4.

When rendering an image, the graphics accelerator 108 determines which fragments are visible at each subpixel sample. A fragment covers a subpixel when the center of the subpixel sample is within an area enclosed by the fragment or, in certain cases, on an edge of the fragment. For subpixels covered by more than one fragment, this determination is based on which fragment has the lowest Z depth at the subpixel, as well as the opacity of the fragments covering the subpixel. The fragments with the lowest Z depth (and thus are closest to the viewer) are referred to as foreground fragments. Fragments with higher Z depth values, which are further from the viewer, are referred to as background fragments. An opaque foreground fragment can occlude a background fragment behind that foreground fragment.

Accordingly, each fragment must pass a Z depth test at one or more of the subpixel samples S1–S4, that is, the Z value 316 of the fragment tuple associated with that fragment must be smaller, i.e., closer from the perspective of the viewer, than the Z value 316 for every opaque fragment covering the same subpixel sample. The Z depth test is used regardless of whether the fragment in question is transparent or opaque. If a fragment passes the Z depth test, then the graphics accelerator 108 stores the fragment tuple associated with the visible fragment in the pixel memory 320.

The displayed color of the pixel 300 depends upon the filtering function used to combine the fragment tuples associated with the subpixel samples S1–S4. One filter function simply uses a weighted average of the colors of the fragment tuples associated with the four subpixels samples S1–S4.

Graphics System With Merge Buffer

Figure 5:
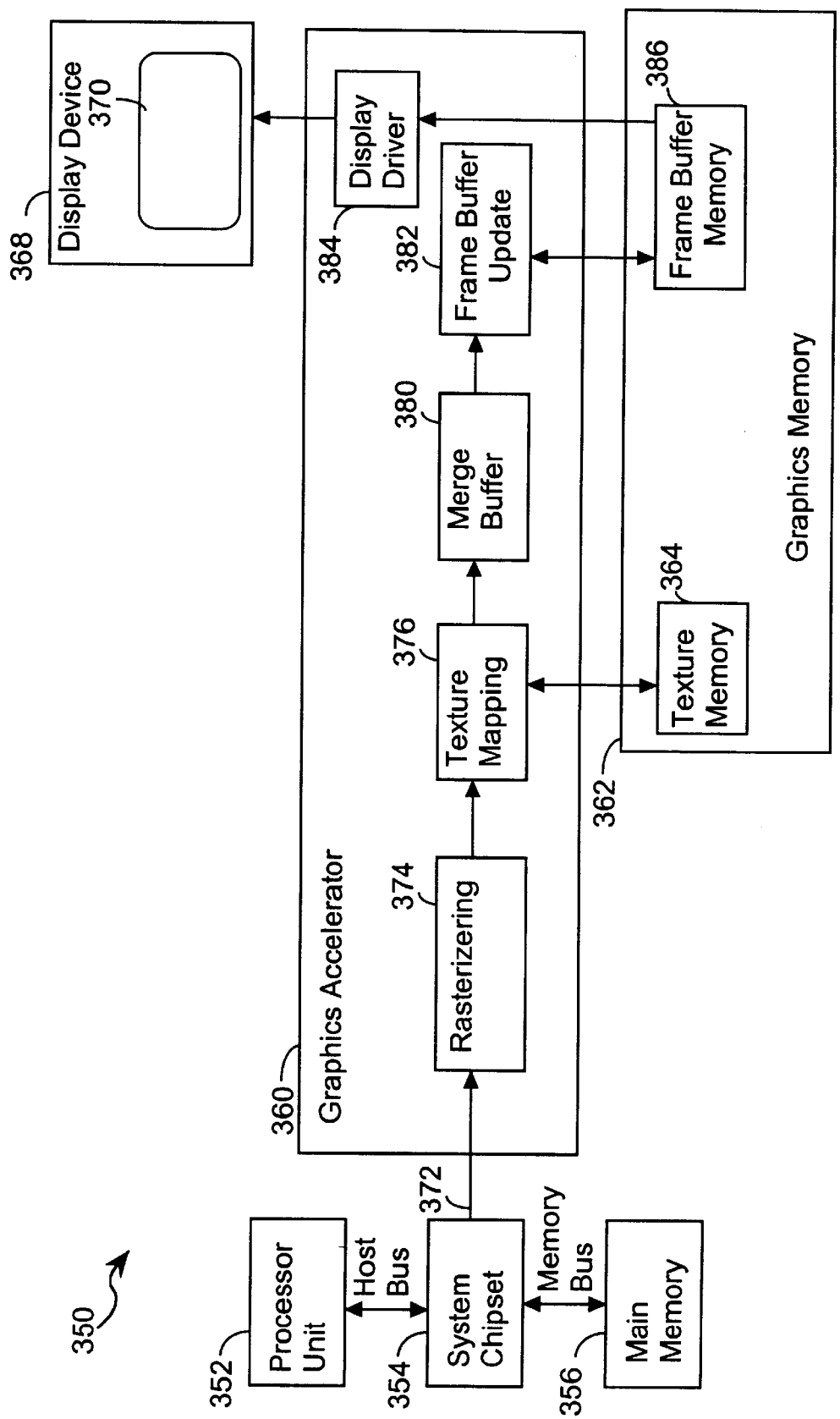
FIG. 5 is a block diagram of a graphics system with a graphics accelerator using the merge buffer of the present invention.

FIG. 5 shows an implementation of a graphics system 350 of the present invention, which provides internal details about the graphics accelerator 108 and graphics memory 122 of FIG. 3. The graphics system 350 includes:

a graphics accelerator 108 for receiving graphical commands from processing unit 102 (FIG. 3), processing the graphics commands to create a graphical image, and outputting the graphical image data in a format to be displayed;

a graphics memory 122 including a texture memory 364 for storing image texture data and a frame buffer memory 366 for storing data regarding the next graphical frames to be displayed.

The graphics accelerator 108 processes the graphical commands in a pipeline. The graphical commands and data subsequently created by graphics accelerator 108 flow through a rasterizer circuit 374, a texture mapping circuit 376, a merge buffer 380 of the present invention, a frame buffer update circuit 382 and a display driver 384. The rasterizer circuit 374 rasterizes primitive graphical objects. In this description, the term "rasterizing" means generating fragments from the input commands (i.e., from the objects specified by those commands). The texture mapping circuit 376 applies a texture map to the fragments. The merge buffer 380 selectively merges the fragments using the techniques of the present invention, and a frame buffer update circuit 382 updates the frame buffer memory 366 with the fragments to be displayed. The fragments flow from the frame buffer update circuit 382 to the frame buffer memory 366 for output via a display driver 384 to the display device 126 (FIG. 3).

Figure 1:
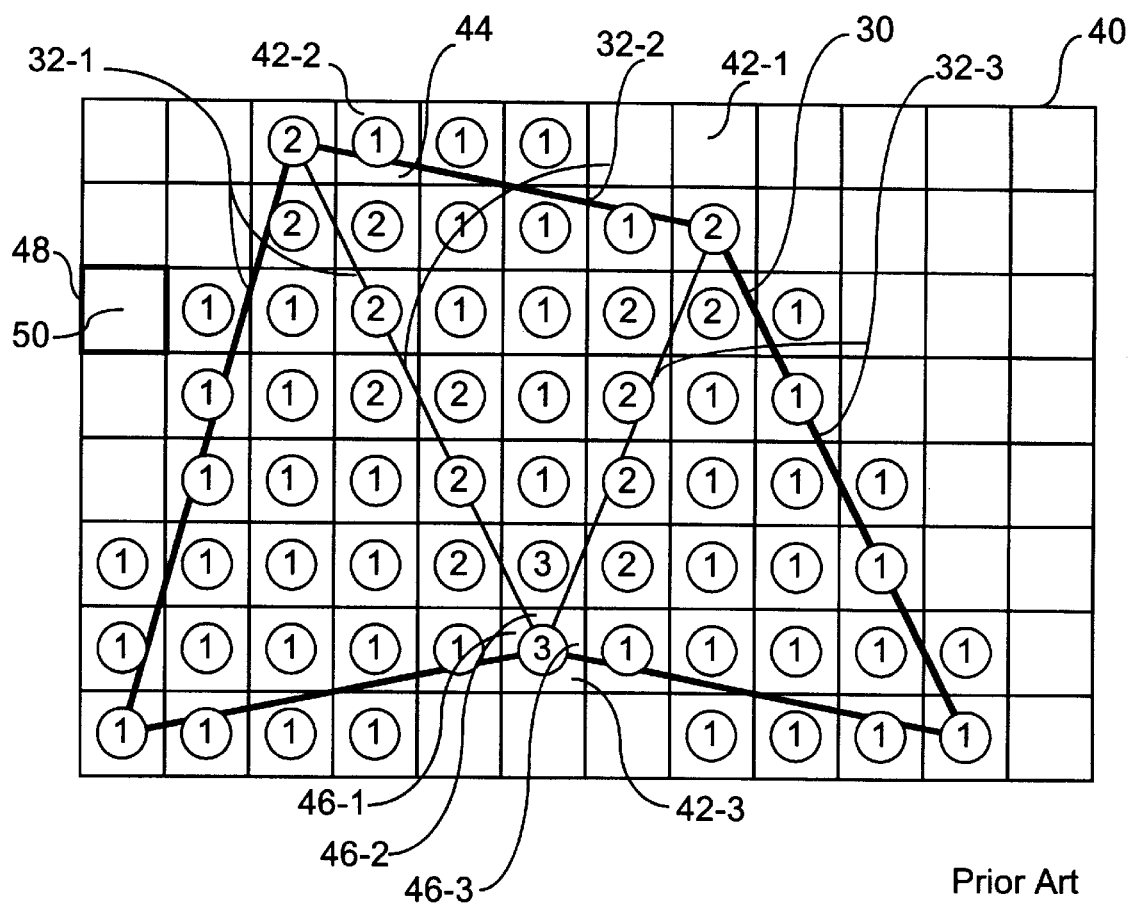
FIG. 1 represents a tessellated surface and the associated pixel fragments.

To display an antialiased 3D object on the display device 126, the object is first tessellated by the host processor to produce a set of primitive objects, such as triangles, that cover the surface of the object. In the preferred embodiment, the primitive objects are triangles. Referring back to FIG. 1, while some pixels are completely covered by a single primitive object, others are covered by two or more of the primitive objects. The portion of each pixel covered by each distinct primitive object corresponds to a distinct fragment. The finer the level at which a curved surface is tessellated (that is, the smaller the primitive objects), the higher the percentage of pixels that will be covered by more than one primitive object from the surface, and thus the more pixels that will have more than one fragment describing a portion of the surface.

After the 3D object or surface has been tessellated into primitive objects, the primitive objects are rasterized by the rasterizing circuit 374 (FIG. 5). The rasterizing circuit 374 determines which of the display's pixels are contained within a primitive object, and determines the associated color, intensity and other data at each pixel within the primitive. The rasterizing circuit 374 generates a fragment for each pixel the primitive object either fully or partially covers. The fragment is represented by a fragment tuple. If the primitive object belongs to a scene with other primitive objects, multiple fragments may be generated for a particular pixel, with each fragment corresponding to a different primitive object. As will be described below, the merge buffer 380 identifies certain pairs of fragments from different primitive objects that are likely to be from the same tessellated surface and merges them prior to delivering them to the frame buffer update circuit 382.

The fragments flow from the rasterizing circuit 374 to the texture mapping circuit 376. If texture mapping is enabled, the texture mapping circuit 376 applies a texture to the fragments and outputs the textured fragments to the merge buffer 380.

The merge buffer 380 selectively merges fragments that are associated with the same pixel before sending the fragments to the frame buffer update circuit 382. To do so, the merge buffer 380 applies heuristics that increase the probability that any fragments that are merged belong to the same tessellated surface, and that merging will not introduce undesirable visual artifacts. As a result of merging, the number of fragments transferred to the frame buffer update circuit 382 is reduced. Because fewer fragments are transferred, the invention reduces the rate at which the frame buffer update circuit 382 processes new fragments. The invention further reduces the number of existing fragments which must be read from and written to the frame buffer memory 366 when processing a new fragment. Therefore, the bandwidth required of the frame buffer update circuit 382 and frame buffer memory 366 for a given level of performance is reduced, thereby improving performance and reducing implementation cost. Since the merge buffer 380 reduces the number of fragments that are processed for a given pixel during a given time interval, the number of stalls in the graphics accelerator pipeline 108 will also be reduced.

After processing in the merge buffer, the frame buffer update circuit 382 adds or blends each fragment output from the merge buffer 380 with previously-received fragments that correspond to the same pixel, and stores the resulting fragments in the frame buffer memory 366. When a new fragment is generated for a pixel, the frame buffer update circuit 382 adds the new fragments to the pixel's existing fragments, replaces one of the pixel's existing fragments with the new fragment, or blends the new fragment with one or more of the existing fragments. The frame buffer update circuit 382 blends the colors of the new fragment and the existing stored fragments to generate a color of a pixel to output to the display. Preferably, the fragments are blended using the techniques described in U.S. patent application Ser. No. 09/301,257 for METHOD AND APPARATUS FOR COMPOSITING COLORS OF IMAGES USING PIXEL FRAGMENTS WITH Z AND Z GRADIENT PARAMETERS, and described more comprehensibly by Norman P. Jouppi and Chun-Fa Chang in "$Z^3$: An Economical Hardware Technique for High-Quality Antialiasing and Transparency" in Proceedings of the 1999 EUROGRAPHICS/SIGGRAPH Workshop on Graphics Hardware, ACM Press, New York, August 1999, pp. 85–91, both incorporated herein by reference as background information.

The Merge Buffer

As discussed above, tessellation and rasterization of a three dimensional surface can generate multiple fragments for at least some of the pixels, and therefore the texture-mapping circuit and the frame buffer update circuit can process multiple fragments for the same pixel from the same surface. When fragments from adjacent primitives cover portions of the same pixel belong to the same tessellated surface, those fragments will often have nearly identical color and depth values. Therefore, the memory and processing bandwidth of the frame buffer update circuit can be reduced if such fragments are merged. It is desired that fragment merging should result in no noticeable loss of visual quality.

Loss of visual quality may occur when two fragments that cover adjacent portions of the same pixel are merged, but belong to different tessellated surfaces. If the fragments belong to different objects or surfaces, then the fragments may be separated in the Z dimension, perpendicular to the screen, by a gap. At some future time, the image rendering process may insert another object into the gap. If these first two fragments are not merged, the two fragments retain their different depth values, and the future object can be rendered properly in front of one fragment but behind the other fragment. But if the two original fragments from different objects are merged, the merged fragment will have a single depth value and a future object that lies between the two original fragments will be incorrectly rendered as completely behind or completely in front of both of the original fragments. The merge buffer uses several heuristics to decrease the probability of merging two fragments belonging to different objects or surfaces.

Loss of visual quality may also occur when two fragments belonging to the same tessellated surface are merged, but the fragments are sufficiently different that a single merged fragment cannot adequately represent them. For example, if the fragments face in substantially different directions, a combined fragment cannot represent the sharp edge between them, and nearby objects may be erroneously obscured or made visible by a single merged fragment. The merge buffer uses several heuristics to decrease the probability that merging two fragment will result in visually objectionable artifacts.

Figure 6:
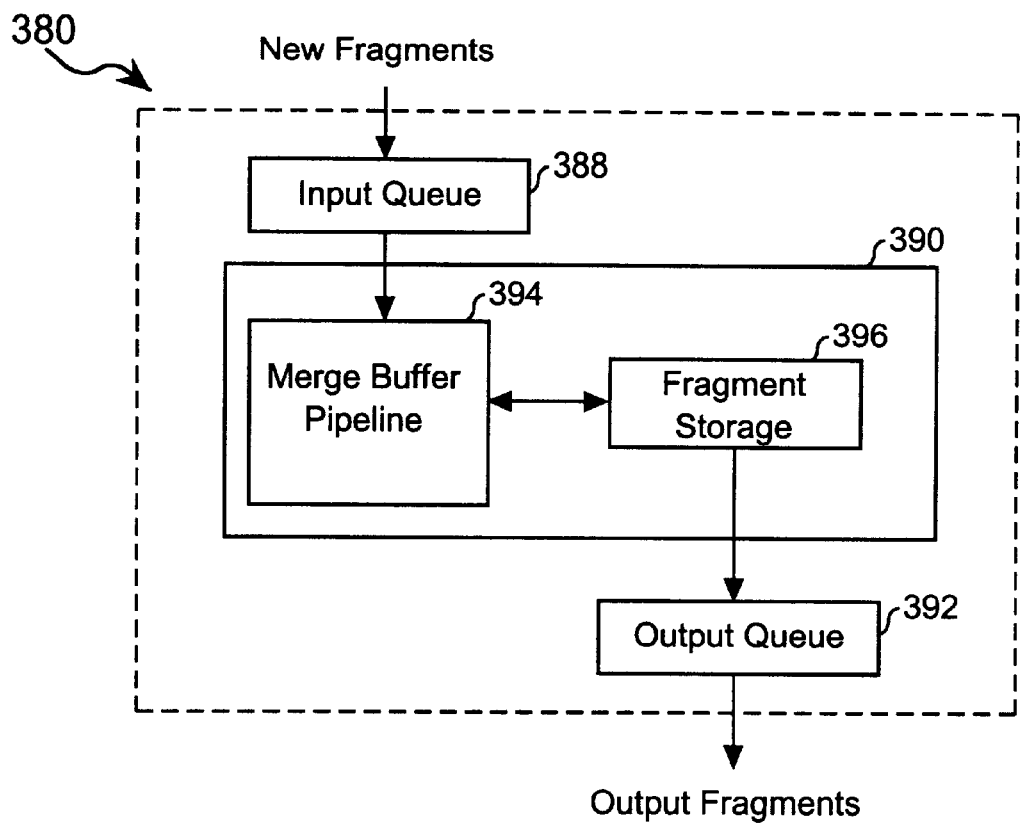
FIG. 6 is a block diagram of the merge buffer of FIG. 5.

As shown in FIG. 6, the merge buffer 380 includes an input queue 388, a main merge block 390, and an output queue 392. The input queue 388 isolates the rasterizer circuit (374, FIG. 5) and the texture-mapping circuit (376, FIG. 5) from the main merge block 390 to allow fragments to continue to be generated even if the main merge block 390 processes certain fragments more slowly than the rasterizer circuit outputs them to the merger buffer 380. The output queue 392 isolates the main merge block 390 from stalls that may occur in the frame buffer update stage 382.

The main merge block 390 has a merge buffer pipeline 394 and a fragment storage 396. The input queue 388, merge buffer pipeline 394, fragment storage 396 and output queue 392 receive and output fragments in blocks, where each block has a predetermined number R of fragments. The input queue 388 receives new blocks of fragments. In the main merge block 390, a new block N of fragments is retrieved from the input queue 388 and inserted into the merge buffer pipeline 394. The merge buffer pipeline 394 selects an existing block E of fragments already stored in the fragment storage 396 to merge with the new block N of fragments. The merge buffer pipeline 394 merges those fragments meeting predetermined merge criteria and stores the merged fragments in the fragment storage 396. Fragments that do not meet the predetermined merge criteria are not merged. The new and existing blocks of fragments pass through all the stages of the merge buffer pipeline 394. The fragment storage 396 ejects blocks of fragments to the output queue 392. For a given x-y screen position, blocks are ejected in the same order that the blocks were received by the input queue 388, taking into account fragment merges.

In FIG. 7A, in the fragment memory, a block 410 stores a predetermined number R of fragments 420 with a tag 414, a mergable bit 416, a likely-to-merge bit 418, and primitive edges 419.

The mergable bit 416 indicates whether the fragments of a block are available or unavailable for merging. The mergable bit 416 is usually set to "mergable" by the rasterizer, and maintains this status when a block is first written to fragment storage 396. For correctness, only the most recent block stored in fragment storage 396 for a given x-y screen position may be merged with a new block. The mergable bit of any block in fragment storage 396 may be set to "not mergable" by the merge buffer pipeline 394 to maintain this condition. This includes the setting of a block in fragment storage 396 to "not mergable" when a new block at the same x-y screen position, and marked "not mergable," arrives at the merge buffer.

The mergable bit 416 is set to "mergable" by the rasterizer only if the techniques described later were used to create the illusion that the triangle is curved, and smoothly connects up to adjacent "curved" triangles with a "rounded" edge. This is typically the case when a curved surface is tessellated into triangles. The mergable bit 416 is set to "not mergable" by the rasterizer to indicate that lighting computations were applied to the triangle as a flat surface, which connects to other flat surfaces with a sharp edge. This ensures that a non-curved tessellated surface (for example, a block with six faces) maintains its sharp edges.

The likely-to-merge bit 418 is used to identify those blocks of fragments that contain the most recently encountered interior or exterior edge of a tessellated surface. Interior edges do not exist in the desired surface, but are an artifact caused by tessellating the surface into primitives such as triangles. Each such interior edge is shared between two primitives that belong to the surface. For example, triangles 32-1 and 32-2 (FIG. 1) share an interior edge. If a surface is tessellated using triangle strips or fans, for example, each triangle in the strip or fan contains an old edge shared with the previous triangle (if any), one new edge that will be shared with the next triangle (if any), and one new edge that does not immediately adjoin either the previous or next triangle. Blocks that contain the new edge that will be shared with the next triangle have their likely-to-merge bit 418 set to True, as they are likely to merge with blocks that are generated in the near future when the adjoining triangle is rasterized.

The likely-to-merge bit 418 is generated in circuitry external to the merge buffer. In one implementation, the rasterizer circuit generates the likely-to-merge bit. For example, the rasterizer can set the likely-to-merge bit to True for fragment blocks that are bisected by the newest internal edge (i.e., of the most recently generated triangle) in a triangle strip or fan. A block is bisected by an edge if some sample points in the block are on one side of the edge, and the rest of the sample points are on the other side of the edge. In other words, the rasterizer will preferably set the likely-to-merge bit to True when generating fragments along the most recently encountered internal edge of a tessellated surface, and otherwise will set the likely-to-merge bit to False.

The primitive edges 419 initially represent the edges of the triangle for which the fragment block was generated. After one or more merges, they represent a subset of the edges of the polygon that is the union of the merged fragments' triangles. For example, in FIG. 1, all blocks generated on behalf of triangle 32-1 initially contain the three vertices of triangle 32-1 in the primitive edges; all blocks generated on behalf of triangle 32-2 initially contain the three vertices of triangle 32-2. After two blocks in the same position along the shared edge between triangles 32-1 and 32-2 are merged, the merged block contains at most two edges from the quadrilateral formed by joining triangles 32-1 and 32-2 and removing the shared edge between them.

The primitive edges 419 are shown in more detail in FIG. 7D. The primitive edges 419 are comprised of three vertex hashes 444-1, 444-2, 444-3, and three bisection bits 446-12, 446-23, and 446-31. To facilitate finding a shared edge between two primitives, the vertex hashes are always stored in clockwise order.

Each vertex hash 444-1, 444-2, and 444-3 is a representation of the (x, y, z) coordinates of one vertex of the primitive (triangle). For greatest certainty that two primitives are part of the same surface, each vertex hash 444 contains the full (x, y, z) coordinates of one of the vertices. Alternatively, to reduce storage requirements in fragment storage 396, the invention applies a hash function to each (x, y, z), and stores the resulting hash values in vertex hash 444.

A hash function "h" takes a coordinate (x, y, z) in 3D space, and performs arithmetic or logical operations to reduce it to a single value with a smaller number of bits. However, this reduced storage comes at a cost: two coordinates that are different may have the same hash value ("alias"). That is:

$$h(x_1,y_1,z_1)=h(x_2,y_2,z_2)$$

even when $$(x_1,y_1,z_1)\neq(x_2,y_2,z_2).$$

To minimize problems with such aliases, the hash function h might be chosen so that vertices that are near each other in 3D space do not hash to the same value. For example, the hash function h might concatenate the bottom 8 bits of the x, y, and z coordinates to create a 24-bit hash value. Since the limited size of fragment storage 396 means that most blocks will have an x-y tag 414 in a small region of 2D space, such a hash function will minimize the chance of aliasing two edges whose vertices have the same hash value, but different coordinates. Alternatively, a hash function that is less efficient to implement, but with strong mathematical guarantees about aliasing frequency, can be employed. See, for example, the chapter "Some Applications of Rabin's Fingerprinting Method" by Andrei Z. Broder, in *Sequences II: Methods in Communications, Security, and Computer Science*, edited by R. Capocelli, A. De Santis, U. Vaccaro, published by Springer-Verlag, 1993, available at ftp://ftp.digital.com/pub/DEC/SRC/publications/broder/fing-appl.ps, and incorporated by reference herein.

Initially, the three edges of the triangle primitive are specified by the three vertex hashes 444-1, 444-2, 444-3. One edge is between vertex hashes 444-1 and 444-2, one between vertex hashes 444-2 and 444-3, and one between vertex hashes 444-3 and 444-1. The bisection bit 446-12 is associated with the edge between 444-1 and 444-2, bisection bit 446-23 is associated with the edge between 444-2 and 444-3, and bisection bit 446-31 is associated with the edge between 444-3 and 444-1. An edge's corresponding bisection bit 446 is set to True if the edge bisects the fragment block, that is, if some sample points in the block are on one side of the edge, and some sample points in the block are on the other side. The bisection bit 446 is set to False if all of the sample points in the block are on the same side of the edge. The bisection bits 446 can easily be computed by a fragment generator based upon half-plane equations, such as that described by Juan Pineda in "A Parallel Algorithm for Polygon Rasterization," SIGGRAPH 88 Conference Proceedings, ACM Press, New York, August 1988, pp. 17–20, incorporated by reference herein as background information.

After merging, as discussed below, the primitive edges 419 represent two connected sides (i.e., an open jaw) of the polygon that results from the union of two or more primitives. Although the embodiment described above uses three vertex hash values and three bisection bits, the scheme is extensible to any number of vertices and bisection bits, so that more than two connected edges of the polygon may be maintained after merging.

Referring now to FIG. 7B, each fragment 420–426 in the block 410 corresponds to a different pixel from a rectangular region of the display. The rectangular region has a width of W pixels and a height of R/W pixels. The tag 414 uniquely identifies the (x, y) location of each block 410, and each of the fragments in the block are said to be associated with the tag 414 for the block. In one embodiment, the tag 414 is the pixel coordinate of one of the corner fragments of the block 410. For example, for a square block 410 having four fragments 420–30 426, each fragment 420–426 corresponding to the pixels with coordinates (x, y), (x, y+1), (x+1, y) and (x+1, y+1), respectively, the tag 414 of the block is (x, y). The coordinates correspond to the location of the pixel on the display and are commonly referred to as screen coordinates. (Note that the tag need not include the least significant bits of x and y that are constant for all blocks. In the example block size of 2×2 pixels, the least significant bit of x and the least significant bit of y are always 0 for the fragment in the lower left corner.)

In FIG. 7C, the exemplary fragment 412 stored in the fragment memory 482 (FIG. 10B) includes a coverage mask 432, color values 434, depth value (Z depth) 436, Z gradient values (Z grad) 438, centroid offsets 440, and normal vector 442.

Several of the fragment fields stored in fragment memory are identical to information stored in the frame buffer memory 366 and previously described in reference to FIG. 4. The coverage mask 432 is identical to coverage mask 322 (FIG. 4), color values 434 are identical to color values 314, Z depth 436 is identical to Z depth 316, and Z gradient values 438 are identical to Z gradients 318.

The centroid offsets 440 are the x and y distances from the lower left hand corner of the pixel to the approximation of the centroid of the fragment. These need only a few bits of precision apiece, for example one bit more than that required to represent the subpixel grid on which the sample points lie. In FIG. 4, with four sample points and thus a 4×4 subpixel grid, the x and y centroid offsets 440 might be stored with 3 bits apiece.

The normal vector 442 (if available from the rasterizer) is a triplet (x, y, z), with a length of one (i.e., $\sqrt{x^2+y^2+z^2}$= 1), which indicates in which direction in 3D space the fragment is facing. The normal vector is perpendicular to the fragment's surface, and in general, is different for each fragment. When a curved surface is tessellated into triangles, the triangles are flat (planar) in space. That is, the Z depth can be expressed as an affine function of x and y. We might therefore assign the same normal vector to each point on the triangle. However, applying lighting computations to such a surface (flat-shaded lighting) gives it a faceted look. For example, a sphere tessellated into many triangles that are then flat-shaded looks like a geodesic dome rather than a sphere. This faceted effect persists even when a curved surface is subdivided into a large number of very small triangles, as the human optic system includes a rather impressive edge detection system.

Thus, well known mathematical techniques are applied to lighting computations to make it appear that different portions of a flat triangle face in different directions. In particular a different normal vector is supplied for each of the triangle's vertices; these normals are then implicitly or explicitly interpolated across the triangle, so that each point in the "flat" triangle has a different normal vector. A light source is reflected from this "curved" surface at slightly different angles from each point on the triangle. This leads to much more realistic lighting effects, as the boundary between different triangles is hidden by smoothly changing colors, rather than accentuated by a sharp difference in colors.

If the graphics accelerator supports a computationally expensive lighting model like Phong shading, the normal vector is explicitly interpolated by the rasterizer (374, FIG. 5) for each fragment. In this case, the rasterizer can provide the per-fragment normal vectors to the merge buffer. In the event that per-fragment normals are not available, the rasterizer might compute an average of the three normal vectors provided at the vertices, and supply the same average normal vector for each fragment in the triangle. In the least desirable case, the rasterizer provides no normal vector information to the merge buffer. In this case, no storage is allocated for normal vector 442 in the merge buffer, and inferior approximations, discussed later, may be used in determining when two fragments may be merged or not. Even when no normal information is available from the rasterizer, it can still indicate whether a triangle is lit with flat-shading, or as a curved surface, via the mergable bit as previously discussed.

Figure 8:
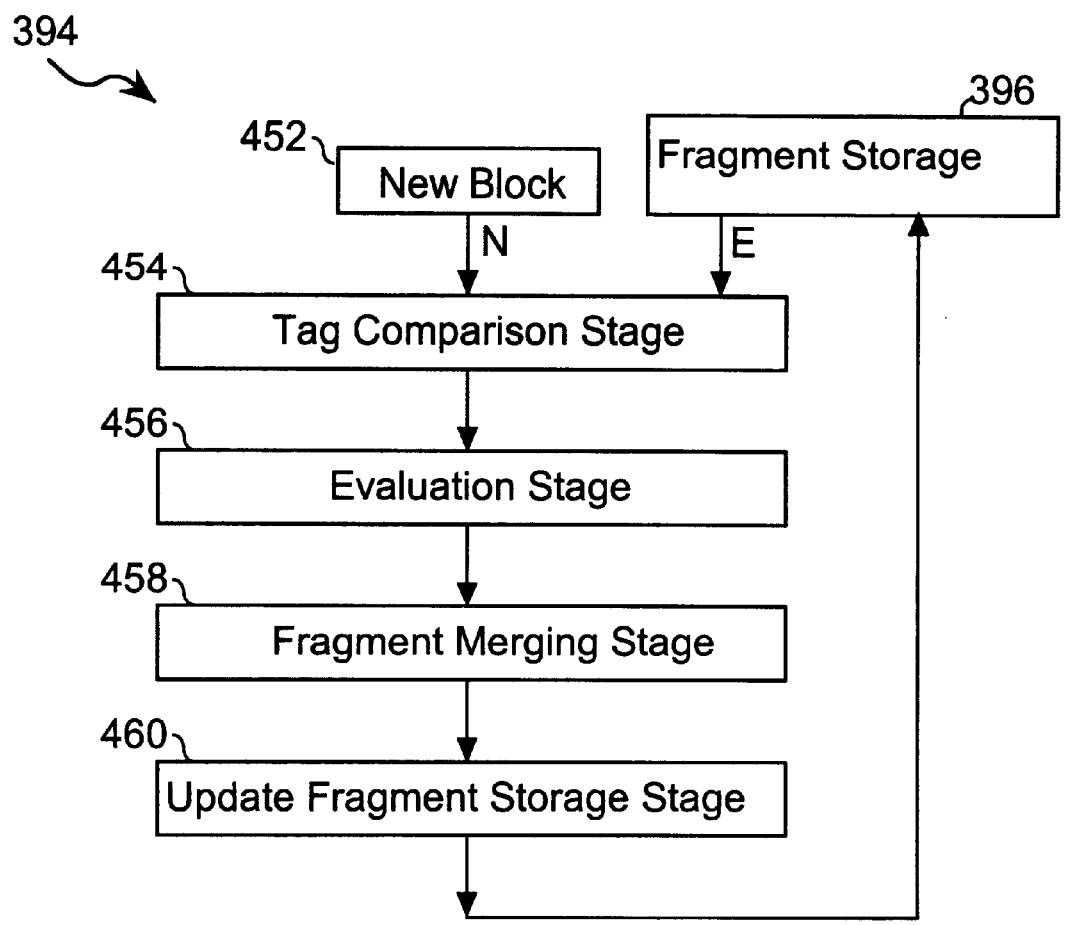
FIG. 8 is a block diagram of a merge buffer pipeline of FIG. 6.

As shown in FIG. 8, there are four major steps that are taken when a new block N 452 of fragments enters the merge buffer pipeline 394 for processing. Each major step is implemented as a separate stage of the merge buffer pipeline 394. The merge buffer pipeline 394 processes a new block N of fragments and one of the existing blocks E of fragments from the fragment storage 396. The four stages of the merge buffer pipeline 394 include: (A) a tag comparison stage 454, (B) an evaluation stage 456, (C) a fragment-merging stage 458, and (D) an update fragment storage stage 460. These merge buffer pipeline fragment processing stages 454–460, and the corresponding image data processing steps performed by those stages are described in more detail below.

Figure 9:
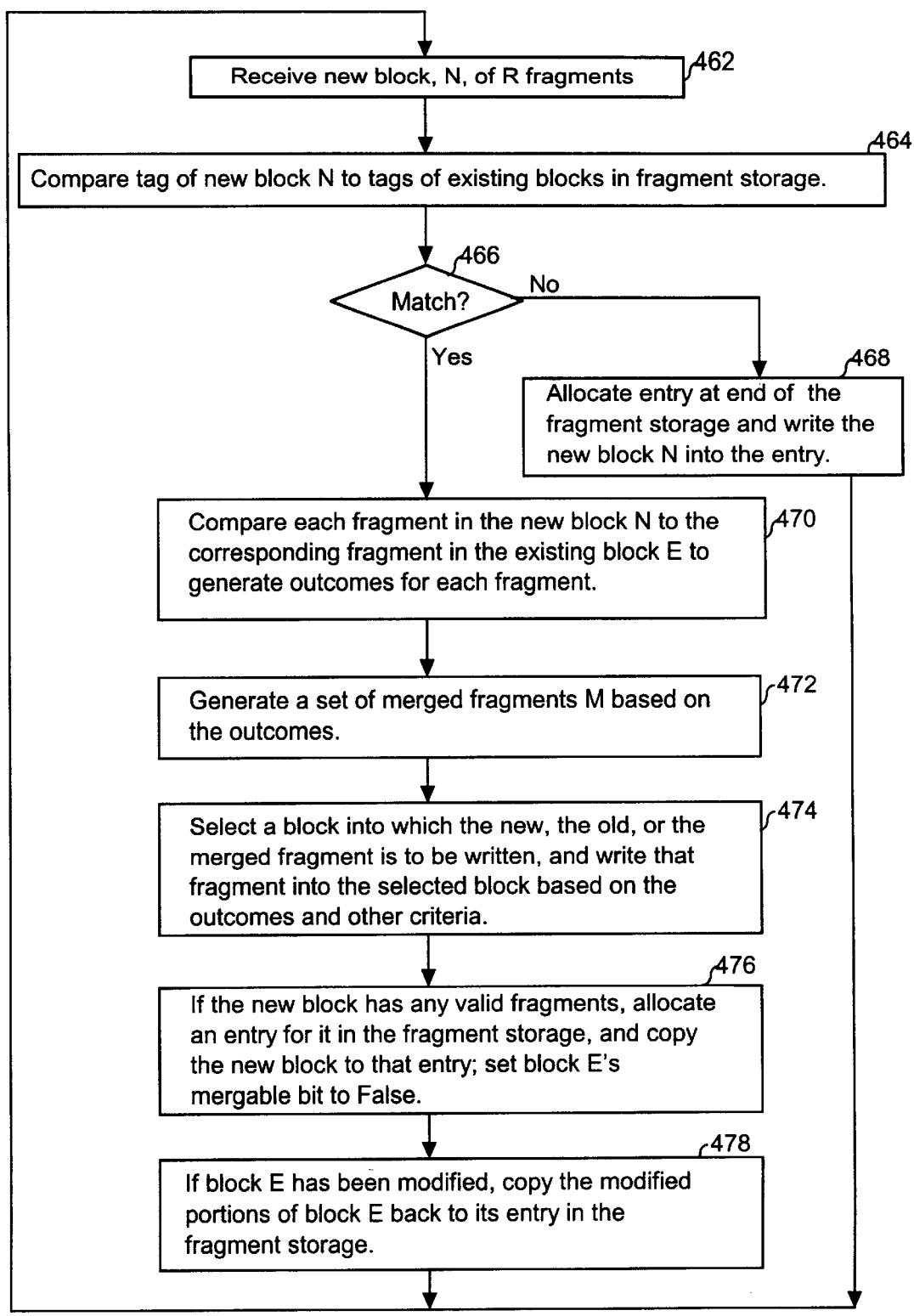
FIG. 9 is a flowchart of a method for processing fragments using the merge buffer pipeline of FIG. 8.

Referring to both FIGS. 8 and 9, a general overview of the operation of the merge buffer pipeline will now be provided. In step 462, the tag comparison stage 454 receives a new block N from the input queue 388 (FIG. 6). In step 464, the tag comparison stage 454 compares the tag of the new block N to the tags of the existing blocks in the fragment storage 396 to determine whether some or all of the fragments in the new block N could be merged with the fragments of one of the existing blocks. More specifically, step 464 determines if there is a block E in the merge buffer's fragment storage that has the same tag as the new block N, and that both N's and E's mergable bits are set to "mergable."

Step 466 determines whether the result of the comparison is a match. If not, in step 468, an entry at the end of the fragment storage 396 will be allocated and the new block N will be stored into the allocated entry. This may be accomplished by writing the new block N directly into fragment storage 396, or by passing the new block N unmodified through the remaining stages of the merge buffer pipeline before being stored in the fragment storage 396.

If in step 466 there is a match, there is exactly one existing block E that has the same tag 414 as N, and has its mergable bit 416 set to "mergable." The fragment storage selects and outputs for merging this block E, which is the most-recently inserted block having the same tag as the new block N. In this description, the term "inserted" also means "stored." Selecting the most-recently inserted block ensures that the merge buffer does not reorder blocks having the same tag, which may lead to undesirable artifacts that violate the semantics of standard 3D application programming interfaces.

In step 470, the evaluation stage 456 compares each fragment of the new block N with a corresponding fragment in the existing block E to generate exactly one of five outcomes for each fragment, based on predetermined similarity criteria. The five outcomes are: don't-care, replace-with-new, replace-with-old, merge and don't-merge.

In step 472, for each respective fragment position in a block, the fragment merging stage 458 generates the fragment from new block N, the fragment from existing block E, or a merged fragment that combines data from the new block N and the existing block E, based on the respective outcome produced by the comparison at step 470. In step 474, the update fragment storage stage 460 selects a block, either the new block N or the existing block E, into which each new, existing or merged fragment is to be stored based on the outcomes from the evaluation stage 456 and other criteria which will be discussed below.

In step 476, if the new block N has at least one valid fragment left after step 474, the update fragment storage stage 460 allocates and copies the new block N into an entry in the fragment storage 396, and sets E's mergable bit to False. In step 478, if block E has been modified, the update fragment storage stage 460 copies the modified portions of existing block E back into its entry in the fragment storage 396.

The fragment storage 396 and each of the four stages 454–460 of the merge buffer pipeline 394 will next be discussed in detail.

Fragment Storage

Figure 10A:
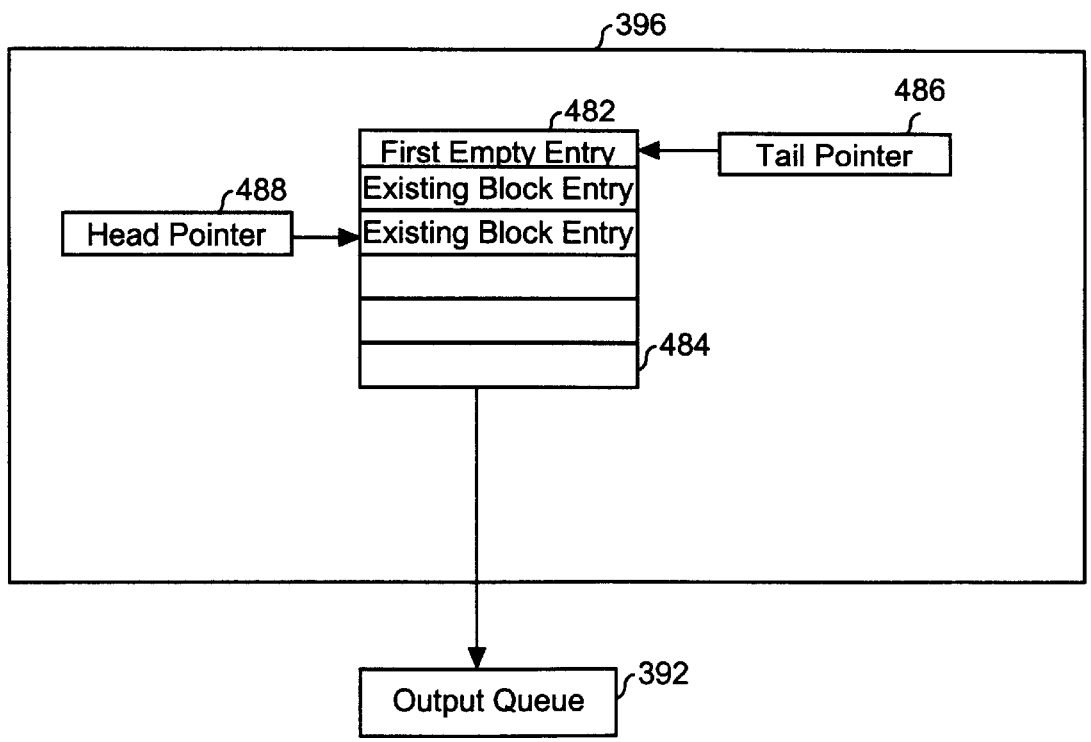
FIG. 10A is a block diagram of the fragment storage of FIG. 6.

In FIG. 10A, the fragment storage 396 stores the fragment data in a fragment memory 482. The fragment memory 482 is implemented as a queue that stores the blocks in one or more entries 484. The queue maintains a first-in-first-out ordering of the blocks of fragments, but allows a new block of fragments to be merged with an older block previously stored in the queue. The queue has a tail pointer register 486 that points to the entry from which the fragment data was least recently ejected, that is, the next available empty entry. The queue has a head pointer register 488 that points to the entry in which the fragment data was least recently inserted, that is, the next entry to be ejected.

To select a potentially mergable block for merging, the tag comparison stage 454 has comparison circuitry to compare the tag of the new block N with the tags of existing blocks in fragment memory 482. In one embodiment, the fragment memory 482 is an associative memory that compares the tags.

Figure 10B:
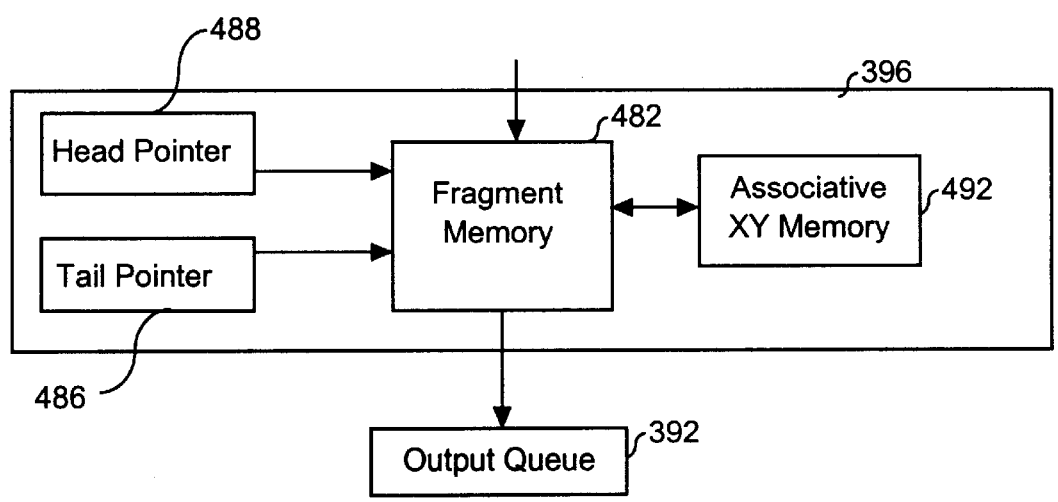
FIG. 10B is a block diagram of an alternate embodiment of the fragment storage of FIG. 6.

As shown in FIG. 10B, in an alternate embodiment, to reduce the size of the associative memory, the fragment storage 396 has a fragment memory 482 and an associative memory 492 (Associative XY Memory). The associative memory 492 stores a predetermined fixed portion of the tag (414, FIG. 7A) for each block, not the entire tag. This portion of the tag stored in associative memory 492 is hereafter called the "partial tag." The fragment memory 482 stores the remaining information for each block, including the portion of the tag not stored in the associative memory 492. There is a one-to-one correspondence between the memory locations of the fragment memory 482 and the associative memory 492, such that each memory location having the same address in the associative memory 492 and the fragment memory 482 is associated with the same block.

During operation, the associative memory 492 identifies a set of prospective candidate matches P between the new block N and the existing blocks that have tags that are sufficiently similar to warrant further investigation. To identify the set of blocks of prospective candidate matches P, the associative memory 492 determines whether the partial tags of any existing block are the same as the partial tag for the new block N, and if the existing block's mergable bit is set to "mergable." For each prospective candidate match, the fragment storage 396 accesses the fragment memory 482 to retrieve the portion of the tag not stored in the associative memory, and compares the retrieved portion of the tag not stored in the associative memory with the corresponding portion of the tag of the new block N. If the retrieved portion of the tag from the fragment memory 482 matches the corresponding portion of the tag from the new block N, the corresponding existing fragment block E is output from the fragment storage 396.

The preferred embodiment limits the number of partial tag candidate matches to at most one. That is, only one block E in the associative memory 492 can have the same partial tag as the new block N, and have its mergable bit set to "mergable." This way, at most a single entry must be read from fragment memory 482 during tag comparison stage 454, and further verification of the rest of the tag bits is left to evaluation stage 456. If evaluation stage 456 determines that the rest of E's tag does not match the rest of N's tag, then block N passes through the merge pipeline unmodified, and E's mergable bit is set to "not mergable." This is accomplished by forcing all fragments in N to have a don't-merge outcome.

This embodiment allows a block E, whose partial tag matches block N's partial tag, to be marked "not mergable" even when block E's complete tag is not identical to block N's. This problem can largely be avoided by choosing the size of the partial tag based upon the number of merge buffer entries. If the merge buffer contains $2^q$ entries, then the bottom q bits of the x and y position of the block (after removing the x and y bits that are constant across all blocks) are candidates for the partial tag. This ensures that any new block N in a sequence of blocks that are connected in the screen's x-y space will pass the full tag comparison test with an existing block E if their partial tags match.

Referring back to FIG. 10A, eventually each block of fragments in the fragment storage 396 is ejected from the merge buffer into the output queue 392. When the fragment storage 396 is full, the least-recently-inserted block, which is pointed to by the head pointer register 488, is ejected. When the fragment storage 396 is not full, blocks continue to be ejected at a substantially reduced rate. In one implementation, a block is ejected from the fragment storage 396 every n cycles, for example every 16. Alternately, all the blocks in the fragment storage 396 are ejected after a predetermined number of cycles have elapsed without receiving a new block. A flush operation is provided for synchronization. For example, before copying any data from the frame buffer; a flush operation is sent down the graphics pipeline, which ensures that the entire contents of fragment storage 396 are ejected before the copy operation proceeds down the pipeline.

It may be important that the ordering of the blocks be preserved to gain the benefits of prior optimizations of the image data. Examples of prior optimizations include generating blocks in an order that minimizes page crossings in a frame buffer, or cache misses in a texture cache. If any such prior optimizations are still relevant, to preserve the ordering, the merge buffer can eject blocks from the fragment storage 396 in FIFO (first in first out) order. Each block that is ejected is the least recently inserted block in the fragment storage 396 at the time that it is ejected.

To show that the merge buffer preserves the ordering of fragments, the general operation of the merge buffer will be described using the following example. Consider a sequence of n blocks that are inserted into the fragment storage 396 in the following order: 1, 2, . . . n. As these blocks are inserted into the fragment storage, blocks having the same tag may merge, thereby deleting multiple instances of blocks having the same tag from the sequence. However, when a new block has a different tag from the tags of the existing blocks, or if the new block has the same tag as an existing block but does not meet other merge criteria in evaluation stage 456, the new block is stored at the end of the fragment storage at the entry pointed to by the tail pointer register 486, and therefore cannot be stored out of order.

Alternatively, such ordering constraints may be non-existent, or unimportant at this point in the fragment processing pipeline. For example, if the merge buffer is after the texture mapping unit, it is not necessary to maintain block ordering intended to minimize cache misses in the texture cache. In such cases, the fragment storage 396 can be treated more like a cache, with the only ordering requirement being that blocks with the same tag must be ejected in the same order they entered the merge buffer. This relaxed ordering requirement allows the merge buffer to eject a block which is unlikely to merge, while keeping blocks which are still likely to merge, even when the block that is unlikely to merge is newer than other blocks that are likely to merge.

Evaluation Stage

When a match is found between the tags of a new block N of fragments with its mergable bit set to "mergable," and an existing block E with its mergable bit set to "mergable," the evaluation stage 456 compares the fragments within the new block N and the existing block E to determine whether any fragments can be merged. That is, each fragment n in the new block N is compared to the corresponding fragment e, in the existing block E. The objective of these comparisons is to determine whether each (n, e) pair of fragments is sufficiently similar to merge without adversely affecting visual quality. For each fragment, the evaluation stage generates exactly one of five outcomes: don't-care, replace-with-new, replace-with-old, merge and don't-merge.

Before further describing the structure and operation of the evaluation stage, some terminology will be reviewed and defined. The coverage mask 432 is the data that records, for the subpixel sample points associated with a pixel, whether each sample point is inside or outside the primitive being rendered. A fragment for which all subpixel sample points lie within the primitive is a fully-covered fragment. A fragment for which at least one, but not all, subpixel sample points are within the primitive is a partially covered fragment. Two fragments overlap or intersect if the intersection of their coverage masks is a non-empty set. If the intersection of the coverage masks of the two fragments is the empty set, the fragments do not overlap.

The block coverage mask is formed by concatenating all the fragment coverage masks in the block. If the intersection of the new block N's coverage mask and the existing block E's coverage mask is the empty set, then the two primitives for which the fragments were generated probably do not overlap, and are therefore potentially mergable according to the present invention.

When a fragment in position i of a block corresponds to a pixel that is not covered by the primitive, the coverage mask for that fragment is the null set and such fragments are referred to as invalid. In this description, the term $n_i$, refers to the $i^{th}$ fragment from the new block N and the term $e_i$, refers to the $i^{th}$ fragment from the new block E. Some fragment in a block may be invalid because, while a block contains R fragments, representing data for a set of R contiguous pixels, the image being rendered may cover only a portion of those R pixels.

Figure 11:
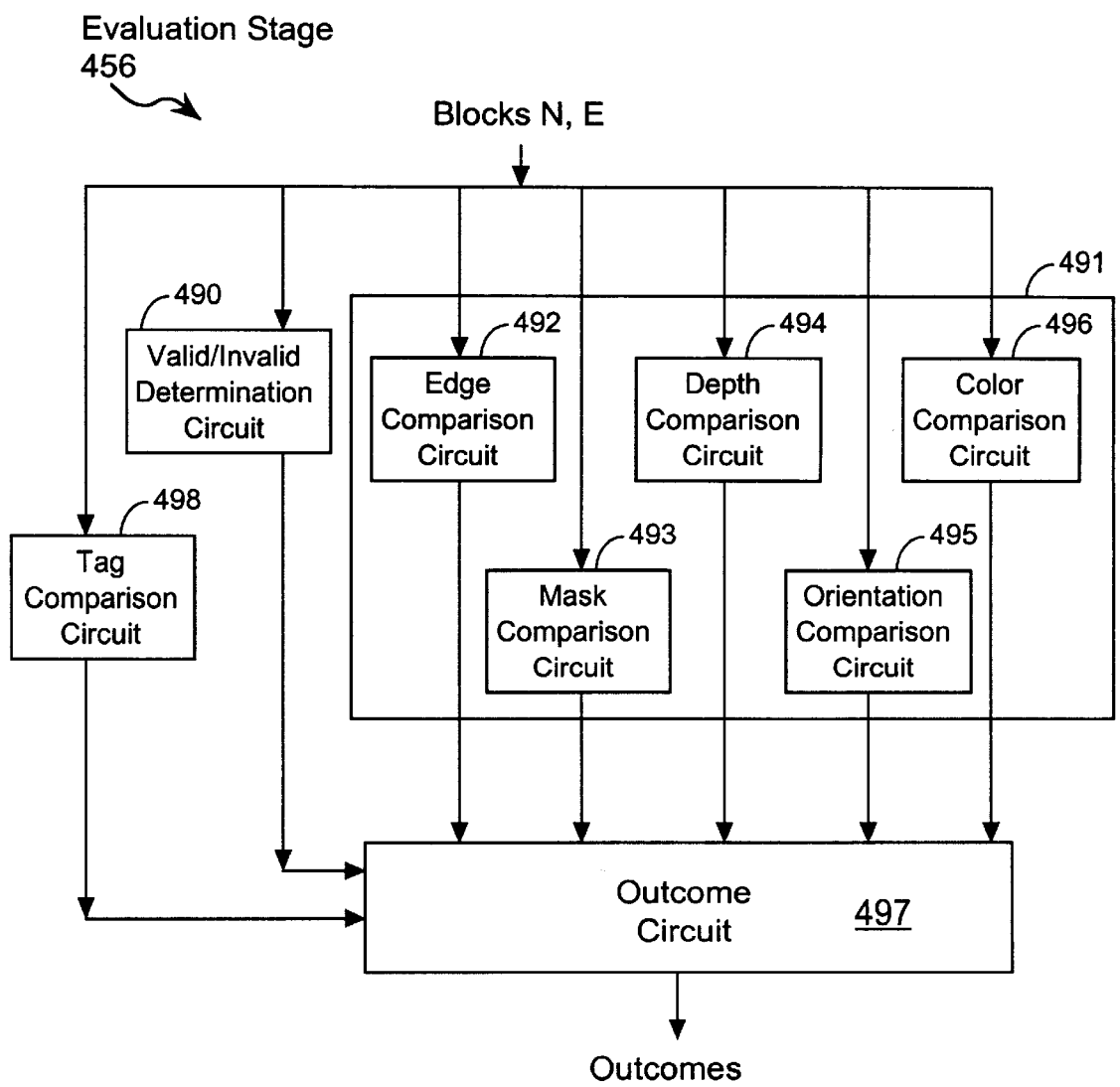
FIG. 11 is a block diagram of an evaluation stage of FIG. 8.

In FIG. 11, to generate the outcomes for a fragment, the evaluation stage 456 has a tag comparison circuit 498, a valid/invalid determination circuit 490, a merge determination circuit 491, and a merge outcome circuit 497. The tag comparison circuit 498 compares the remainder of the blocks' tags. If the tags do not match, then blocks N and E are not at the same pixel address, and the merge outcome circuit 497 generates a don't-merge outcome for each fragment position in the block.

Otherwise, the valid/invalid determination circuit 490 computes if $n_i$ is valid and if $e_i$ is valid. The merge outcome circuit 497 generates the don't-care outcome when fragments $n_i$ and $e_i$ are both invalid. The replace-with-old outcome is generated whenever fragment $n_i$ is invalid and fragment $e_i$ is valid, in which case the output fragment will subsequently be $e_i$. The replace-with-new outcome is generated when fragment $e_i$ is invalid and fragment $n_i$ is valid, in which case the output fragment will subsequently be $n_i$.

If the tags match and fragments $n_i$ and $e_i$ are both valid, then merge outcome circuit 497 uses results from the merge determination circuit 491 to determine whether to generate the merge or don't-merge outcome. The merge outcome circuit 497 generates the merge outcome when the two fragments' primitives have a common edge that bisects the block, the two fragments' blocks do not overlap (i.e. their block coverage masks do not intersect), the two fragments have roughly the same orientation in 3D space, and their color and depth values are sufficiently similar to allow merging without substantially affecting visual quality; otherwise it generates the don't-merge outcome. An edge comparison circuit 492 determines if the fragments' primitives share an edge that bisects the block. A mask comparison circuit 493 determines whether the coverage masks of the fragments' blocks do not overlap. A depth comparison circuit 494 determines whether the depth of the fragments is sufficiently similar to allow merging. An orientation comparison circuit 495 determines whether the fragments face in roughly the same direction in 3D space. A color comparison circuit 496 determines whether the colors of the fragments are sufficiently similar.

Figure 12:
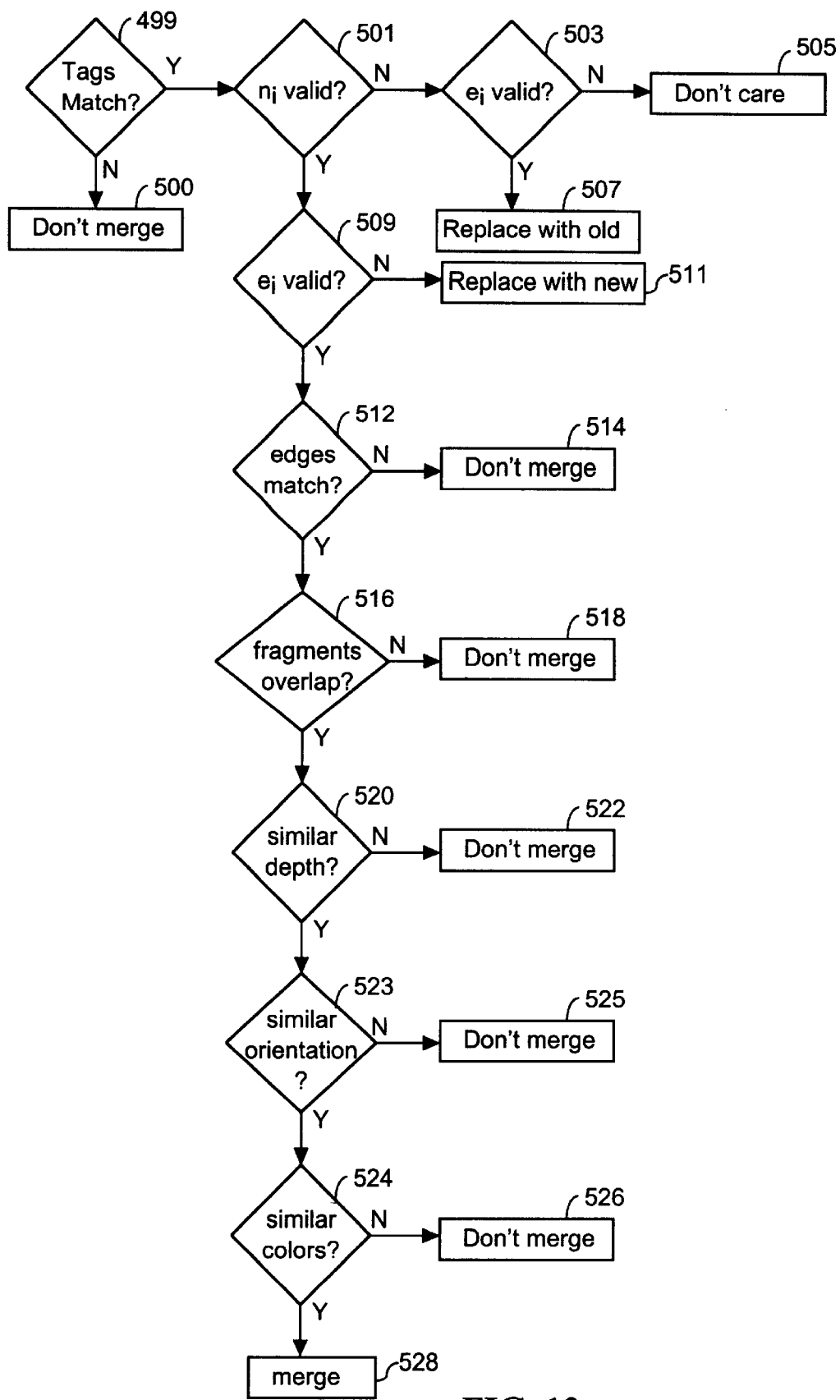
FIG. 12 is a flowchart of a method for determining whether to merge fragments using the evaluation stage of FIG. 11.

In FIG. 12, a flowchart of the outcome generation circuit 497 is shown. In step 499, if the remainder of the tags stored in fragment memory 482 do not match, the outcome generation circuit 497 generates a don't-merge outcome (500). Otherwise, in step 501, if fragment $n_i$ is valid, it proceeds to step 509, otherwise to step 503. In step 503, if fragment $e_i$ is valid, the outcome generation circuit 497 generates a replace-with-old outcome (507), otherwise both $n_i$ and $e_i$ are invalid and it generates a don't-care outcome (505). In step 509, if fragment $e_i$ is valid, it proceeds to step 512 to determine if merging criteria are met, otherwise the outcome generation circuit 497 generates a replace-with-new outcome (511). In step 512, if the edge comparison circuit 492 determines that the fragments' primitives do not share a common edge that bisects the block, the outcome generation circuit 497 generates a don't-merge outcome (514). Otherwise, in step 516, if the mask comparison circuit 493 (FIG. 11) determines that the fragments' blocks overlap, the outcome generation circuit 497 generates a don't-merge outcome (518). Otherwise, in step 520, if the depth comparison circuit 494 (FIG. 11) determines that the depth of the fragments is not sufficiently similar, the outcome generation circuit 497 (FIG. 11) generates a don't-merge outcome (522). Otherwise, in step 523, if the orientation comparison circuit 495 determines that the fragments face in substantially different directions in 3D space, the outcome generation circuit 497 generates a don't-merge outcome (525). Otherwise, in step 524, if the color comparison circuit 496 (FIG. 11) determines that the colors of the fragments are not sufficiently similar, the outcome generation circuit 497 (FIG. 11) generates a don't-merge outcome (526). Otherwise, in step 528, the outcome generation circuit 497 (FIG. 12) generates a merge outcome.

The evaluation stage 456 will be discussed in further detail below including the criteria used by each of the determination circuits 492–496 in merge determination circuit 491. The fragment merging stage and the update fragment storage stage will be described prior to describing the evaluation stage in further detail.

The Fragment Merging Stage

After the evaluation stage 456 (FIG. 11) generates the outcomes, the new block N and the existing block E proceed to the fragment merging stage 458 (FIG. 8). If the outcome for a fragment i is replace-with-new or don't-merge, the fragment merging stage 458 outputs the new fragment $n_i$. If the outcome for a fragment i is replace-with-old, the fragment merging stage 458 outputs the old fragment $e_i$. If the outcome for a fragment i is don't-care, the fragment merging stage 458 outputs an invalid fragment with a coverage mask that is all 0's.

Otherwise, the two fragments can be merged, and the fragment merging stage 458 (FIG. 8) creates a new merged fragment, referred to as $m_i$, by combining the new and existing fragments' primitive edges, coverage masks, normal vectors, depth values, depth gradients, and colors.

If a pair of fragments merge, then their corresponding primitives must have a common edge that bisects the blocks. That is, two of N's vertex hashes 444 must be identical to two of E's vertex hashes 444, and their respective corresponding bisection bits 446 must be True. There can be at most one such matching edge between the two blocks. The merge has the effect of eliminating this common edge, for example by joining two triangles into a quadrilateral. We thus have no further need to represent the common edge and its respective corresponding bisection bit 446 that is stored in both block N and block E. After one merge, this leaves as many as four vertices and four bisection bits that might be relevant to the merged surface. (In general, after n merges this leaves as many as n+3 vertices and bisection bits that might be relevant.)

Figure 13A:
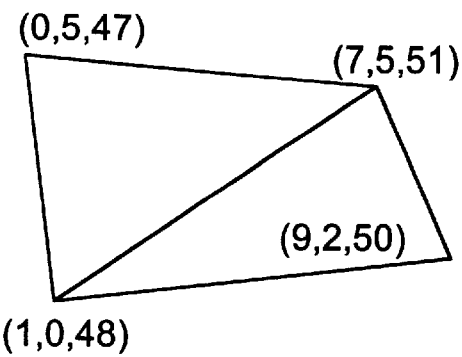
FIGS. 13A–13E illustrate a merge of two fragments' edge signatures.
Figure 13B:
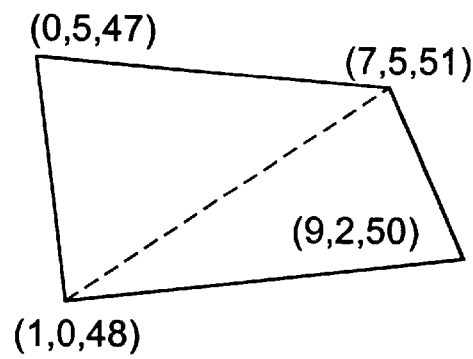

Two triangles specified by the primitive edges 419 in two blocks prior to merging are illustrated in FIG. 13A. The triangle with vertices (1, 0, 48), (0, 5, 47) and (7, 5, 51) is rasterized first, the triangle with vertices (1, 0, 48), (7, 5, 51), and (9, 2, 50) is rasterized second. After two blocks along the shared edge with vertices (1, 0, 48) and (7, 5, 51) are merged, the merged block is now part of the quadrilateral formed from vertices (1, 0, 48), (0, 5, 47), (7, 5, 51), and (9, 2, 50). This quadrilateral is shown in FIG. 13B, where the eliminated shared edge from (1, 0, 48) to (7, 5, 51) is shown with a dashed line.

However, a block's primitive edges 419 has just three vertex hashes 444 and three bisection bits 446. These can represent just two connected edges of the four edges of the quadrilateral. We use two criteria, with the first criterion taking precedence, to determine which edges to keep in the merged block. First, if an edge has a False bisection bit, the edge cannot be used to satisfy the criteria used by edge comparison circuit 492. Thus, any such edges need not be stored in the merged block's primitive edges 419. Second, the two unshared edges that are part of the newer triangle are more important than the two unshared edges that are part of the older triangle. This exploits the fact that if the two triangles are part of a triangle strip or triangle fan, then the next triangle in the strip or fan will occur on one of the edges of the newer triangle.

Thus, up to two edges, with True bisection bits, are chosen for the merged block, such that the number of edges with True bisection bits from the newer triangle are maximized. (The open jaw from vertex hash 444-3 to 444-1 always has a False bisection bit 446-31 in the merged block.)

Figure 13C:
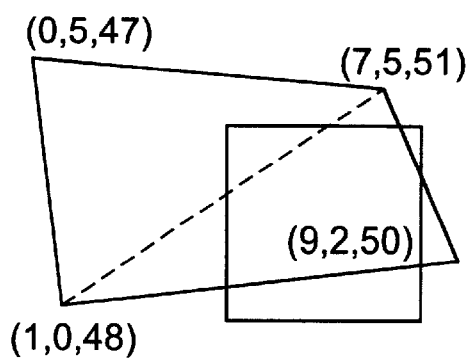
Figure 13D:
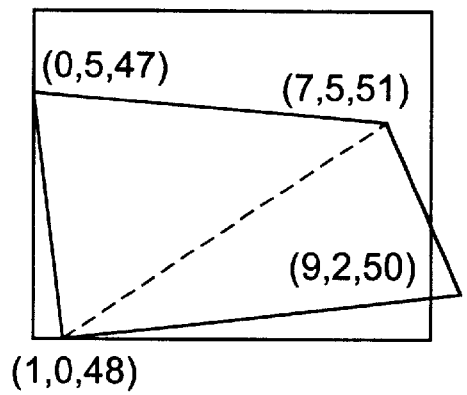
Figure 13E:
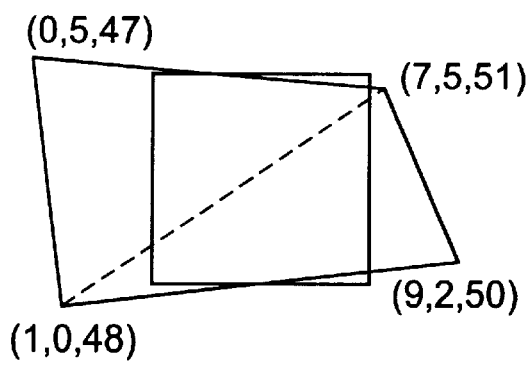

Some examples are shown in FIGS. 13C, 13D, and 13E. In FIG. 13C, a 4×4 pixel merged block bisects the two connected edges with vertices from (7, 5, 51) to (9, 2, 50), and thence to (1, 0, 48). (For ease of illustration and reference to vertices, here the size and position of the fragment block vary from figure to figure; in reality the block size is constant, and these different merging situations apply to triangles that are of different sizes.) Since there are only two connected edges with True bisection bits, the second criterion doesn't come into play.

In FIG. 13D, all four edges of the quadrilateral bisect an 8×8 pixel block. We again choose the two connected edges with vertices from (7, 5, 51) to (9, 2, 50), and thence to (1, 0, 48), because the unshared edges from the newer triangle take priority over edges from the older triangle.

FIG. 13E shows the oddest case. The 4×4 pixel block is bisected by two unconnected edges, one from the newer triangle and one from the older triangle. We cannot represent both of these edges, so must choose the single edge from the newer triangle at (9, 2, 50), and (1, 0, 48). Since the two edges connected to that chosen edge both have False bisection bits, it is irrelevant which (if either) we store.

Although the preferred embodiment maintains three vertex hashes 444 and bisection bits 446, it should be clear that this scheme is extensible to any number of vertices and bisection bits. As the number of vertices increases, the decisions about which vertices to keep may become more complex, especially if unconnected edges may be chosen. More vertices would be desirable for applications that tessellate surfaces into triangles that aren't strips or fans, which increases the likelihood that triangles generated in the future will share an edge with the older triangle rather than the newer triangle.

Figure 14:
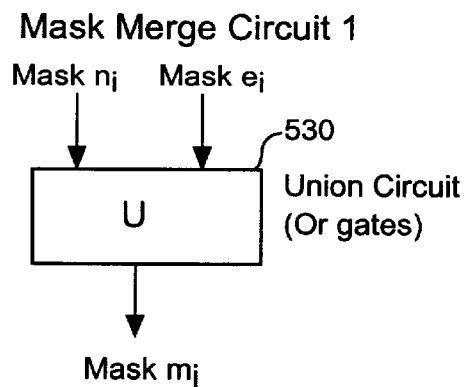
FIG. 14 is a block diagram of a coverage mask merge circuit of a fragment merging stage of FIG. 8.

In FIG. 14, in the fragment merging stage, a subpixel mask merge circuit 530 generates a coverage mask of the merged fragment $m_i$ by taking the union of the coverage masks of fragments $n_i$ and $e_i$.

If the rasterizer supplies a normal vector 442 (FIG. 7C) for each fragment, then the merged fragment $m_i$ contains a renormalized average of $e_i$'s and $n_i$'s normal vectors. A simple average of the normal vector components in general creates a vector with non-unit length, and so it must be renormalized to unit length. We do not need to compute the length of the new vector, but can instead use a table lookup to determine the renormalization multiplier.

Let $(x_n, y_n, z_n)$ be fragment n's normal vector $v_n$, and $(x_e, y_e, z_e)$ be e's normal vector $V_e$. We first compute the sum of the two vectors as:

$$(x_s, y_s, z_s) = (x_n, y_n, z_n) + (x_e, y_e, z_e)$$

We desire the normalized merged vector $v_m$ to be the summed vector divided by its length:

$$(x_m, y_m, z_m) = (x_s, y_s, z_s) / \|(x_s, y_s, z_s)\|$$

The length of the summed vector is really:

$$\mathrm{sqrt}((x_n+x_e)^2 + (y_n+y_e)^2 + (z_n+z_e)^2)$$

Expanding and regrouping:

$$\text{sqrt}((x_n^2+y_n^2+z_n^2)+(x_e^2+y_e^2+z_e^2)+(2x_nx_e+2z_nz_e))$$

Since the original vectors were normalized to a length of 1, we thus have:

$$\text{sqrt}(2(1+x_nx_e+y_ny_e+z_nz_e)).$$

Finally, the last three terms in the above equation for determining the length of the merged vector are the dot product $v_n \cdot v_e$ of the normal vectors, which is computed in advance by the evaluation stage 456, as discussed below in the Evaluation Stage: Merge Criteria section. As a result, the length of the summed vector can be represented as $$\text{sqrt}(2(1+v_n \cdot v_e)),$$

and more importantly, the value of the dot product $v_n \cdot v_e$ of the normal vectors is obtained from the evaluation stage 456 and therefore does not have to be re-computed.

Further, since the vectors $v_n$ and $v_e$ are normalized, the dot product is between −1 and 1, inclusive. To renormalize the sum of the vectors, we can use a lookup table of, for example, 64 or 128 entries. The index to the table is the dot product. The output of the table is the function:

$$1/\text{sqrt}(2(1+\text{input}))$$

The sum of the normal vectors is multiplied by the table output to create the renormalized, merged vector $v_m$.

Figure 15A:
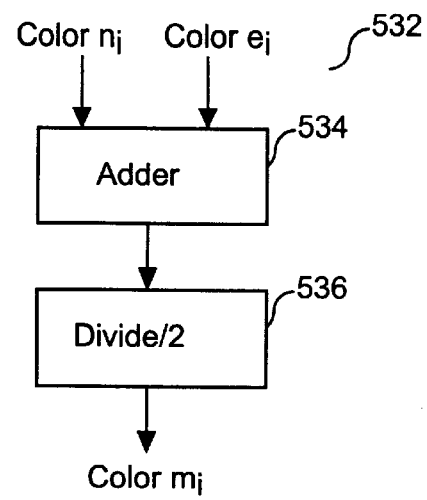
FIG. 15A is a block diagram of a color value merge circuit of the fragment merging stage of FIG. 8.

At least two approaches can be used to generate the color values of the merged fragment $m_i$. As shown in FIG. 15A, a subpixel color merge circuit 532, generates color values for the merged fragment $m_i$ by taking a 50/50 blend of each color component from $n_i$ and $e_i$. An adder 534 adds the corresponding components of the new and existing fragments, $n_i$ and $e_i$, respectively, and a divider 536 (implemented as a wire shift) divides the resulting sum by two.

Figure 15B:
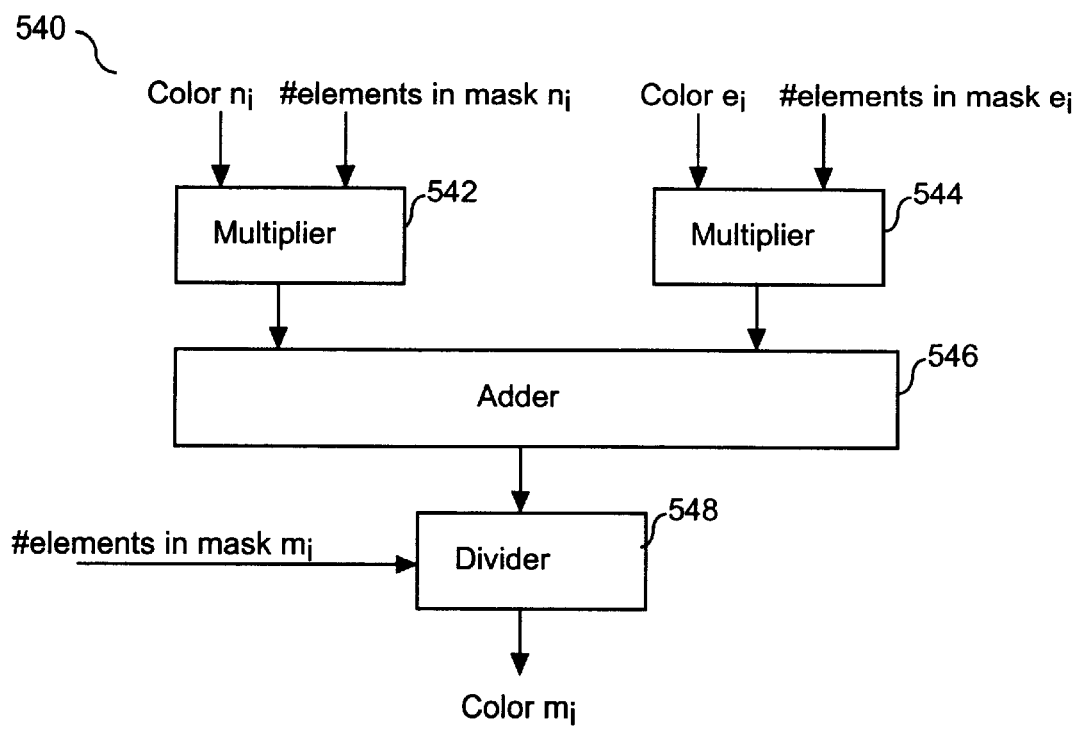
FIG. 15B is a block diagram of an alternate embodiment of a color value merge circuit of the fragment merging stage of FIG. 8.

As shown in FIG. 15B, in a second embodiment, the subpixel color merge circuit 540 generates color values for the merged fragment $m_i$ using a weighted average in which each fragment's color components are multiplied by the number of samples in its coverage mask, the two weighted colors are summed, and then divided by the number of samples in the merged coverage mask. This approach provides more accurate results, but requires more computation.

A multiplier 542 multiplies the color values of the new fragment $n_i$ by the number of samples in the coverage mask for the new fragment $n_i$. Another multiplier 544 multiplies the color values of the existing fragment $e_i$ by the number of samples in the coverage mask for the existing fragment $e_i$. An adder 546 sums the output of the multipliers 542, 544. A divider 548 divides the output of the adder 546 by the number of samples in the coverage mask for the merged fragment $m_i$. In one implementation, the divider 548 is implemented using a multiplier that multiplies the output of the adder 546 by the reciprocal of the number of samples in the coverage mask for the merged fragment $m_i$ because the divisor has a small set of small values and multiplication is faster than division.

The fragment merging stage generates the depth values for the merged fragment $m_i$ using either an average or weighted average using the circuit described above with respect to FIGS. 15A and 15B, respectively, except that depth values are processed instead of color values.

Figure 16A:
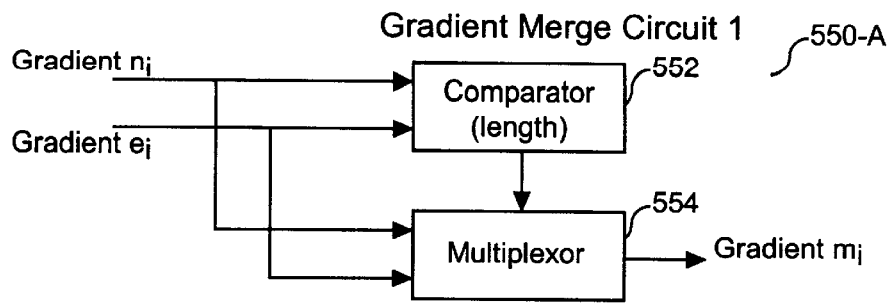
FIG. 16A is a block diagram of a gradient merge circuit of the fragment merging stage of FIG. 8.

As shown in FIG. 16A, the fragment merging stage also generates Z gradient values 438 for the merged fragment $m_i$.

A gradient merge circuit 550-A has a comparator 552 that compares the squares of the lengths of the gradients (i.e., the sum of the squares of the gradient components) of the new and existing fragments, $n_i$ and $e_i$. A multiplexor 554, based on the result of the comparison, outputs the gradient with the shortest length as the gradient for the merged fragment $m_i$. That is, using the depth gradients as an example, let the components for the new fragment be $(Z_x^n, Z_y^n)$, and those of the existing fragment be $(Z_x^e, Z_y^e)$. In this case, the merged fragment's depth gradient will be that of the new fragment if the following relationship is true:

$$Z_x^n * Z_x^n + Z_y^n * Z_y^n < Z_x^e * Z_x^e + Z_y^e * Z_y^e$$

where "*" represents the multiplication operation.

Otherwise, the merged fragment's depth gradient will be that of the existing fragment's depth gradient.

Figure 16B:
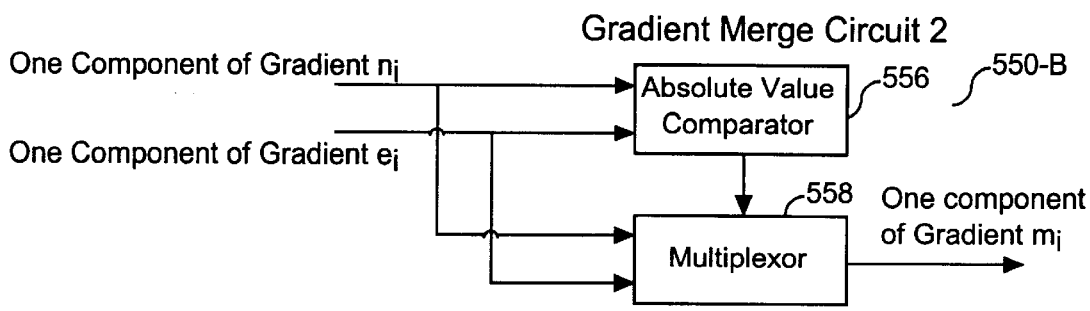
FIG. 16B is a block diagram of an alternate embodiment of the gradient merge circuit of the fragment merging stage of FIG. 8.

In FIG. 16B, alternately, the gradient merge circuit 550-B determines the gradient components (e.g., $Z_x^m, Z_y^m$) individually of the merged fragment $m_i$ by, for each component of $m_i$, selecting the corresponding component of $n_i$ if its absolute value is less than that of the corresponding component of $e_i$, and otherwise, selecting the corresponding component of $e_i$. That is, using depth gradients as an example, $Z_x^m$, the x-component of the merged fragment, will be set equal to $Z_x^e$, the x-component of the depth gradient of the existing fragment $e_i$, if the absolute value of $Z_x^e$ is less than the absolute value $Z_x^n$, otherwise $Z_x^m$ will be set equal to $Z_x^n$. An absolute value comparator 556 compares the absolute values of each corresponding component from the existing fragment $e_i$ and the new fragment $n_i$, and a multiplexor 558 outputs one of the components based on the determination of the absolute value comparator 556. One copy of the circuit shown in FIG. 16B is used for each of the two gradient components.

Figure 16C:
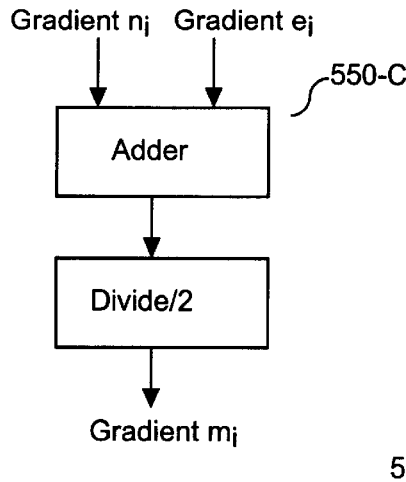
FIG. 16C is a block diagram of another alternate embodiment of the gradient merge circuit of the fragment merging stage of FIG. 8.
Figure 16D:
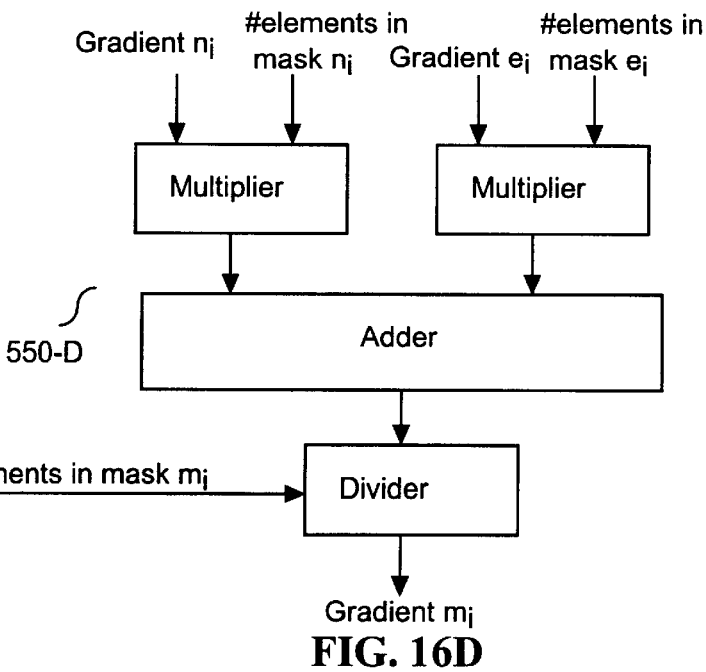
FIG. 16D is a block diagram of yet another alternate embodiment of the gradient merge circuit of the fragment merging stage of FIG. 8.

As shown in FIGS. 16C and 16D, other gradient merge circuits 550-C, 550-D may be used to generate gradient values for the merged fragment $m_i$ using an average or weighted average, respectively, as described above in conjunction with FIGS. 15A and 15B.

Update Fragment Storage Stage

Figure 17:
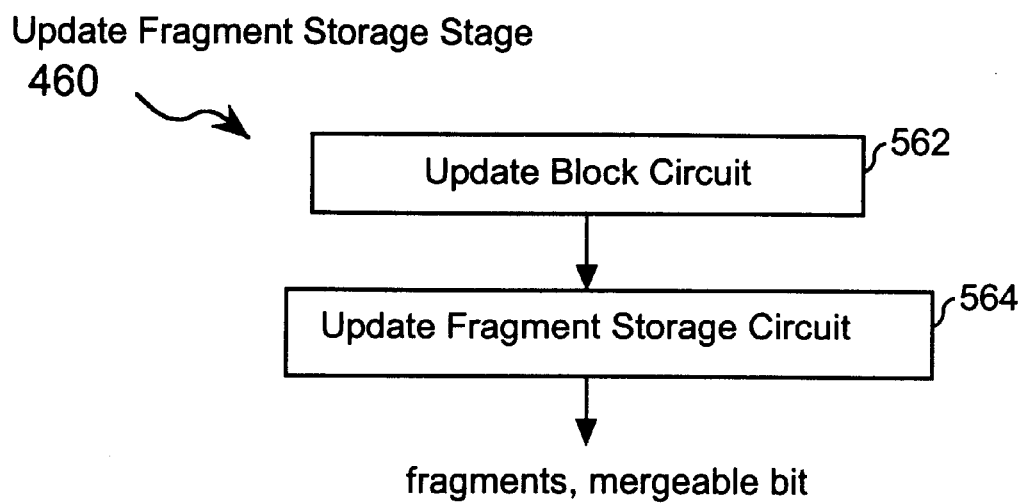
FIG. 17 is a block diagram of an update fragment storage stage of FIG. 8.

In FIG. 17, after the R fragments in the new block N have been compared to the R fragments in the existing block E and merging is complete, the update fragment storage stage 460 updates the contents of the new block N and the existing block E with the fragments that were merged and with those fragments that are to replace other fragments. An update block circuit 562 updates the fragments in the new block N and/or the existing block E. In one embodiment, the block into which each fragment is written is determined independently of the outcomes for the other fragments. An update fragment storage circuit 564 stores the updated new block N and/or the existing block E in the fragment storage.

Because the comparison of each new and existing fragment pair results in a single fragment to be stored—the new fragment $n_i$, the existing fragment $e_i$, or the merged fragment m—up to R fragments are updated; and up to R other fragments may be invalidated. A fragment is invalidated by setting its coverage mask equal to zero, that is, the coverage mask is the null set.

Note that the block (N or E) into which a given fragment is written depends on the comparison outcome and whether the fragment is likely to merge again in the future as determined by the likely-to-merge bit associated with block N.

Table 1 below summarizes the relationship between the comparison outcome, the fragment output from fragment merging stage 458, the likelihood that block N's fragments will merge again in the future, and the block into which the fragment is written.

TABLE 1

The relationship between comparison outcomes and where a fragment will be written

| Outcome | Fragment | N Likely to Merge | N Unlikely to Merge |
| --- | --- | --- | --- |
| don't-merge | new, n | leave in block N | |
| replace-with-new | new, n | leave in block N | move to block E |
| replace-with-old | existing, e | move to block N | leave in block E |
| merge | merged, m | write into block N | write into block E |
| don't-care | none valid | not applicable | not applicable |

Note that the likely-to-merge bit of block N identifies if N's fragments were generated along the most recent primitive edge of a tessellated surface, and thus have a good change of merging with fragment blocks that will soon enter the merge buffer. The likely-to-merge bit of block N, along with the outcomes, determines whether a fragment is written into the new block N or the existing block E. When either a fragment $e_i$ or a fragment $m_i$ is written into block N, the corresponding fragment at position i in block E is invalidated. In the case of merge, the fragment in block E is invalidated because it has been superceded by the merged fragment, and in the case of a "replace-with-old" operation, the fragment in block E is invalidated because that fragment has been moved into block N. Similarly, if a fragment $n_i$ or $e_i$ is written to block E, the corresponding fragment in block N is invalidated.

Figure 18:
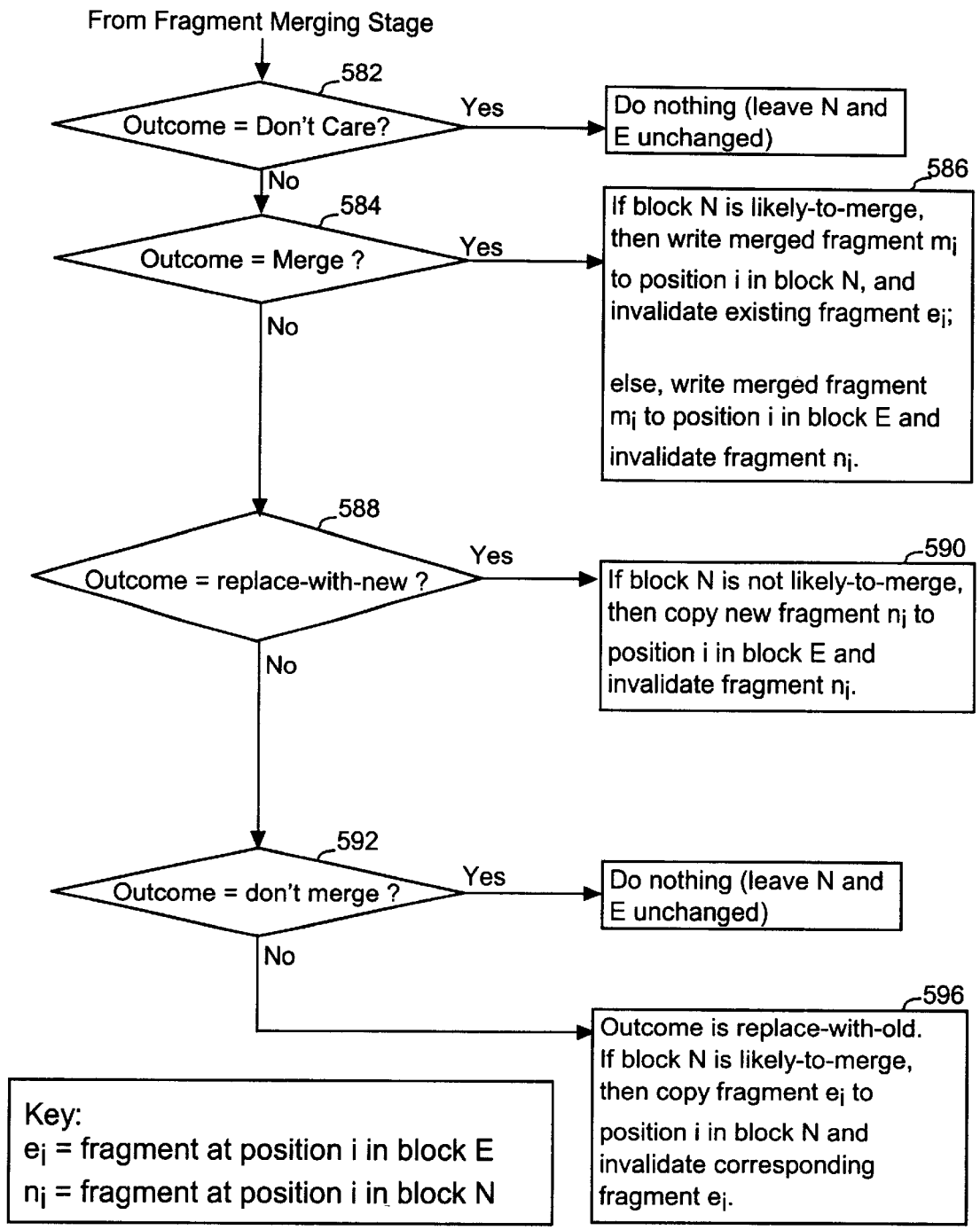
FIG. 18 is a flowchart of a method of operating an update block circuit of FIG. 17.

Referring to FIG. 18, a flowchart of the operation of the update block circuit 562 (FIG. 17) will be used to explain Table 1 in more detail. In step 582, when the outcome of the evaluation circuit is don't-care, no fragment is written into the new or the existing blocks because both fragments are invalid.

Otherwise, in step 584, when the outcome is merge, step 586 writes the merged fragment $m_i$ to the new block N if N is likely-to-merge, and invalidates the existing fragment $e_i$ in block E. If N is not likely-to-merge, then the merged fragment $m_i$ is written to the existing block E, and the new fragment $n_i$ in block N is invalidated.

When step 588 determines that the outcome is replace-with-new, in step 590, if N is likely-to-merge, the new fragment $n_i$ remains in the new block N. If N is not likely-to-merge, the new fragment $n_i$ is written into the-existing block E and the new fragment $n_i$ in block N is invalidated.

In step 592, when the outcome is don't-merge, the new and existing fragments remain in their respective locations in the new and existing blocks. Otherwise, the outcome is replace-with-old, and in step 596 if the new block N is likely-to-merge, then the existing fragment $e_i$ is written to the new block N, and the corresponding fragment in the existing block E is invalidated. If N is not likely-to-merge, step 596 leaves the existing fragment $e_i$ in the existing block E.

In this way, we move as many fragments as possible (old, new, and merged) into a new block N containing fragments that are likely to merge. Since the new block N will be ejected after the existing block E, this improves the odds that these fragments may indeed merge in the future before being ejected from fragment storage. On the other hand, if the new block N doesn't contain fragments likely to merge, we move as many fragments as possible into the existing block E. This leaves more space for future fragments in the new block N and in the best case empties the new block N completely, so that it need not be written to, and take up space in, fragment storage 396.

It will be appreciated that the relationships shown in Table 1 correspond to but one embodiment of the present invention. One of ordinary skill in the art may select any suitable method for determining how to update the merge buffer in accordance with the principles of the present invention. For example, in an alternate embodiment, likely-to-merge information may be unavailable from the fragment generator, and so might be assumed to be always false. In this case, fragments from the new block N are written into the existing block E whenever possible (i.e., whenever the fragments are merged, and whenever the old fragment in block E is replaced by the new fragment in block N). Or likely-to-merge might be assumed to be always true, so that fragments from the existing block E are written into the new block N whenever possible.

Once all the fragments output from fragment merging stage 458 have been processed by the update block circuit 562, the update fragment storage circuit 564 (FIG. 17) examines the new block N. If N still has at least one valid fragment, the entry identified by the fragment storage tail pointer is allocated and the new block N is copied into the allocated entry. In addition, the existing block E is marked as not available for merging with future blocks, by setting its mergable bit to False, because only the most recently inserted block for each tag value is allowed to merge with future blocks.

The update fragment storage circuit 564 then copies any modified portions of the existing block E back into its original entry of fragment storage. The copy-back process updates the entry to reflect the fragments that are no longer valid, the fragments that have been replaced with a merged fragment and the fragments from the new block N.

To decrease the amount of time to copy blocks into the merge buffer and decrease hardware cost, in an alternate embodiment, the criteria for writing fragments is modified to prevent any new or merged fragments from being written into the existing block E when at least one of the fragments output from the fragment merging stage 458 (FIG. 8) must be written to block N by the fragment update storage stage 460.

This alternate embodiment can reduce the number of write ports into fragment memory 482 (FIG. 10B) from two down to one, which in turn greatly reduces the chip real estate occupied by fragment memory 482. To achieve this reduction, the mergable bit, and a valid bit for each fragment is allocated to a narrow fragment valid memory with two write ports. The valid bits override the coverage mask bits 432 (FIG. 7C) stored in fragment memory 482. (In essence, the valid bits are logically ANDed with the coverage mask bits to obtain the true coverage masks.) Whenever a fragment is copied from an existing block E to the new block N, only the fragment valid bits for E must be set to zero. The rest of the data for block E, stored in fragment memory 482, need not be updated. Similarly, whenever a new block N must be stored in fragment memory 482, and so E's mergable bit must be set False, the rest of the data for block E in fragment memory 482 need not be updated.

In one embodiment, fragment memory 482 (FIG. 10B) provides two read ports. One read port is used to read out a block from fragment memory 482 in order to write the block to the output queue 392, so that the block is eventually sent to the frame buffer update 382 (FIG. 5). A second read port is used to read out an existing block E whose tag matched that of a new block N.

In an alternate implementation, most of fragment memory 482 is implemented with a single read port (except for the valid bits and mergable bit mentioned above, which require two read ports). This alternate implementation assumes that if an existing block E matches N's tag, then the two blocks will usually merge completely into a single block. Thus, we read from fragment memory 482, on average, not much more than one block for each block processed. If no tag from associative memory 492 matches block N's tag, we need not read out an existing block E, but must later read N to retire it, so a single read is required to process N. On the other hand, if a tag matches and we must read out an existing block E, this embodiment expects a don't-merge outcome to be rare. If no fragment has a don't-merge outcome, then the two blocks are coalesced into a single block, leaving either N or E empty. We need not subsequently read out most of empty block to retire it, as the valid bits, which have two read ports, indicate whether a block has any valid fragments. Again, a single read suffices to process N. The only case in which we need two reads to process a new block N is when we read out an existing block E for merging, but then a rare don't-merge outcome leaves valid fragments in both N and E. When only one read port is available for both functions, reading a block for ejection has priority over reading a block for possible merging, in order to ensure that an entry in the fragment storage can be allocated for a new block if needed. If, simultaneous with ejection, a merge read was required, the merge read would be stalled.

In another alternate implementation, to reduce the storage cost per fragment, some information is stored on a per-block basis such as the Z gradients 438 (FIG. 7C) and/or the surface normal vectors 442.

Evaluation Stage: Merge Criteria

The determination of whether the merge buffer should merge a new fragment $n_j$, and an existing fragment $e_i$ is based on an estimation of whether the new and existing fragments belong to adjacent, non-overlapping primitives of the same tessellated surface. Further, to enable a single merged fragment to adequately represent the two fragments with a minimum of artifacts, we wish to also establish that the primitives face in approximately the same direction (don't bend too sharply), that neither of the primitives is being viewed nearly edge-on, and that the primitives are lit or textured with similar colors. In a preferred embodiment, described below, this determination is made by comparing the information associated with the fragments including the primitive edges, coverage masks, normal vectors (if available), depth values (optional), depth gradients, and color.

Here is a summary of the merge criteria:

1. Primitive edge comparison. This test attempts to determine if the two primitives are physically adjacent and connected in 3D space, by looking for a shared edge between the primitives. It is unlikely that two primitives that are not adjacent and connected in 3D space will have two 3D vertices in common. However, this possibility becomes more likely when x, y, and z coordinates are mapped to discrete values of limited precision, and the primitive edge comparison test can be fooled by such an occurrence. If the vertices are hashed into fewer bits, the test may also be fooled by two different edges whose vertices hash into the same two vertex hash values.

2. Coverage mask overlap. This test determines if there is any overlap between the two primitives' 3D projection into 2D space, by comparing the two fragment coverage masks. Since the coverage mask overlap test examines only the projection in 2D space, does not check for adjacency, and uses the discrete coverage mask samples rather than a continuous representation of the primitive edges, it is less stringent than the primitive edge comparison. For example, two primitives that are merely near each other in 2D screen space but are not adjacent in 2D space, let alone adjacent or even near in 3D space, can pass this test. However, it provides an inexpensive secondary test to reject two different edges that hash into the same vertex hash values, and thus fool the primitive edge comparison. In the event that normal vectors are not available, it further tests that two primitives of the same tessellated surface show the same side to the viewer (both front face or both back face).

3. Orientation tests. Even if two primitive objects appear to be part of the same surface, they should not be merged if any of the following conditions are true:
    (a) the primitive objects face in directions that are too different, because a single Z value and Z gradient vector can't adequately represent the two primitives (a merged fragment would bevel a sharp edge, possibly to the point of allowing another, obscured surface to "pop through" the bevel); or
    (b) one of the surfaces is nearly edge-on, because then its Z gradient will be relatively large, and thus may fool the Z projection test below; or
    (c) the two primitives show different faces (front and back, or back and front) to the viewer.

If the rasterizer provides per-primitive or per-fragment normal vectors, these orientation tests are quite accurate.

If the rasterizer does not provide normal vectors, orientation tests (a) and (b) may be ignored, with only a small increase in artifacts. Under typical conditions, the knowledge that the triangles have been shaded as "curved" surfaces is sufficient to establish that they face in substantially the same direction near the shared edge.

Alternatively (and optionally), orientation tests (a) and (b) can be approximated by using the Z gradient information as described below in the alternative embodiment. These approximations can be quite inaccurate. The Z gradient tests will not pass fragments that shouldn't be merged, but have the opposite problem of rejecting many surfaces that may in fact have similarly oriented normal vectors. In particular, Z gradient tests tend to reject two surfaces that are nearly face-on to the observer, thus reducing the efficiency of the merge buffer. Orientation test (c) cannot be approximated by using Z gradient information, but the coverage mask test above will reject two primitives that show different faces if the primitives do indeed belong to the same tessellated surface.

4. Z projection test. This tests compares Z values to determine if two primitives are approximately the same distance from the viewer. It provides a useful, but not cheap, tertiary backup to tests 1 and 2 above. If the merge buffer is relatively small, it is probably desirable to avoid the real estate (i.e., registers and other circuitry) required to implement the Z projection test, and instead allocate a large number of bits to the vertex hash 444. Either the full Z coordinate might be stored in the vertex hash, or a hash function can be applied that reduces the number of bits in Z by a moderate amount. If the merge buffer is large, however, it may be desirable to use a more aggressive hash function on the primitive vertices, which will cause more aliasing that can make test 1 less accurate. The Z projection test can then help weed out primitives that were incorrectly determined to share an edge. The Z projection test can be "fooled" by a primitive object that is viewed nearly edge-on, as such an object has a relatively large Z gradient and thus its projection may span such a large range of Z values that it encompasses almost anything in the scene.

5. Color tests. Even if two primitives are adjacent parts of the same surface, and are similarly oriented, they may still have a large color (or alpha transparency) variation (especially near reflected highlights, or because of texture mapping). If the color, or any component of the color, of the two primitives differ by more than a threshold value, the fragments should not be merged.

Primitive Edge Comparison

The first criterion for merging considers the primitive edges 419. Two fragments are merged only if they have a common edge that bisects the blocks (that is, both blocks have in common two vertex hashes 444, with a True corresponding bisection bit 446). As explained above, the vertex hashes are stored in clockwise order. The common edge may be represented by any of the three pairs (444-1, 444-2), (444-2, 444-3), or (444-3, 444-1) in the older block E, and any of the three pairs (444-2, 444-1), (444-3, 444-2), (444-1, 444-3) in the newer block N. Each vertex hash 444 in block E must be compared to each vertex hash 444 in block N, so nine vertex comparisons are required to implement the edge comparison finction. This test is performed once for the entire block, and then the result is fed into the individual fragment outcome circuits.

Coverage Mask Overlap

The second criterion for merging considers the coverage masks. Two fragments are merged only if the intersection of their respective block's coverage masks is the null set, that is, all corresponding pairs of fragments in the two blocks do not overlap. If the intersection of the block coverage masks is not null, then either the two fragments do not belong to adjacent primitives on the same tessellated surface, or belong to adjacent primitives on the same tessellated surfaces in which one primitive has its front face visible and the other has its back face visible. As discussed above, merging two such fragments would substantially increase the potential for artifacts. As with the primitive edges, the coverage mask overlap test is performed once for the entire block, and then the result is fed into the individual fragment outcome circuits.

Figure 19:
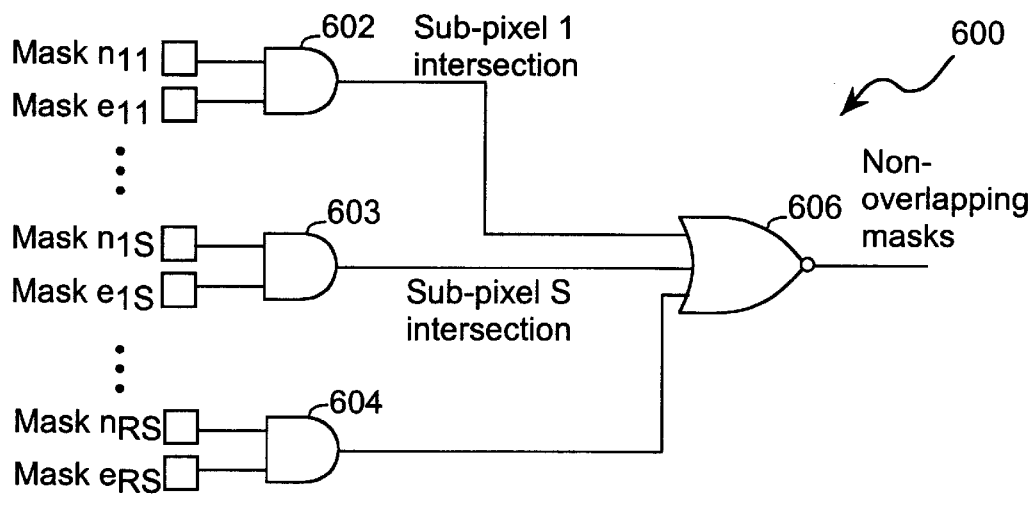
FIG. 19 is a circuit diagram of a mask comparison circuit of the evaluation stage of FIG. 11.

In FIG. 19, an exemplary mask comparison circuit 600 determines whether the coverage masks of the existing and new blocks overlap. The coverage masks of two blocks overlap if, for at least one position in the coverage masks, both masks have a one bit at that position. Let S denote the number of sample points per fragment, R denote the number of fragments per block, and $f_{ij}$ denote the $j^{th}$ coverage mask bit of the $i^{th}$ fragment in block F. A set of AND gates 602–604 determines whether the individual coverage masks bits of corresponding fragment pairs $(n_{1l}, e_{1l}) \ldots (n_{lS}, e_{lS}) \ldots (n_{RS}, e_{RS})$ overlap. A NOR gate 606 generates a non-overlapping mask signal with a value of one when the block coverage masks do not overlap.

Orientation Tests

The third set of criteria for merging involves the orientation of the two fragments in 3D space, and is composed of three parts. We wish to determine that (a) two fragments face in substantially the same direction, (b) that neither fragment is viewed nearly edge-on, and (c) that both fragments present the same face (front or back) to the viewer. We describe two implementations of these tests. In the first implementation, the rasterizer provides normal vectors for each fragment, block, or primitive, and thus orientation information is directly available. In the second implementation, such vectors are not available, and instead some rough approximations based upon Z gradients are used for tests (a) and (b).

If normal vectors are available from the rasterizer, it can send these normal vectors down the pipeline to the merge buffer, which can then compare the angular displacement between the two fragments' normal vectors. The cosine of the angle theta between two such normal vectors is easily computed using the dot product of the vectors. That is, if $(x_n, y_n, z_n)$ is the normal vector $v_n$ for a fragment $n_i$, and $(x_e, y_e, z_e)$ is the normal vector $v_e$ for a fragment $e_i$, we have:

$$\text{cosine(theta)} = v_n \cdot v_e = x_n x_e + y_n y_e + z_n z_e$$

To ensure that two normal vectors are within some maximum angle maxTheta, we must test that:

$$\text{cosine(theta)} > \text{cosine(maxTheta)}$$

Since cosine(0) is equal to 1, we test cosine(theta)>cosine (maxTheta) to establish that theta<maxTheta.

A good value for maxTheta depends upon the granularity of the normal vectors supplied by the rasterizer. If the rasterizer provides normal vectors on a per-fragment or per-block basis, then the interpolation of the three normals provided at the vertices of the triangle should result in normal vectors that are identical along the shared edge. Thus, the normal vectors for fragments or blocks in the two primitives that are near the shared edge will be within a few degrees of each other, and maxTheta might be, for example, 5°. If the rasterizer provides a normal vector on a per-triangle basis, then the normals will be separated by a larger angle, and maxTheta might be chosen to be, for example, 20°.

To ensure that neither normal vector represents a nearly edge-on view, we can compute the angle $eye_n$, between the z axis (that is, the viewer), and the normal vector $v_n$, as:

$$\text{cosine}(eye_n) = v_n \cdot (0,0,1) = z_n$$

and $eye_e$ similarly:

$$\text{cosine}(eye_e) = v_e \cdot (0,0,1) = z_e$$

We then test that these angles are within some maximum angle maxEye, for example 85°. Since the vectors may be pointing at the observer (for front-facing fragments), or away from the observer (for back-facing fragments), we must use the absolute value of the cosines:

$$\text{abs}(z_n) > \text{cosine(maxEye)} \text{ AND } \text{abs}(z_e) > \text{cosine(maxEye)}$$

Finally, we can test that both vectors face the viewer, or that both vectors face away from the viewer. This merely requires testing that:

$$\text{sign}(z_e) = \text{sign}(z_n)$$

More typically, the graphics accelerator supports a simpler, less accurate lighting model like Gouraud shading. This lighting model implicitly assumes that the surface normal changes across the primitive object, but per-fragment normals are not explicitly computed. In this case, surface normal vectors are unavailable to the merge buffer.

In a low cost implementation, the mergable bit 416 can be used as an indication if the two primitives face in substantially the same direction, thus avoiding orientation test (a) entirely. If the mergable bit 416 is "not mergable" because the triangle is flat-shaded, then merging is suppressed for all the fragments in the block. On the other hand, if the triangle is shaded as a curved surface, and the mergable bit 416 is "mergable," we can assume that the two primitives, in the vicinity of the shared edge, face in substantially the same direction. After all, if the triangles are treated as curved surfaces, then they join smoothly along the shared edge. This assumption is not infallible: it can be violated if two small triangles are joined at a sharp angle along the shared edge. Although the (implicit) interpolation of the normal vector produces identical vectors along the shared edge, the small triangle size and the sharp angle conspire to alter the normal vectors at a high rate of change for points not exactly on the edge. Thus, points near the shared edge might have substantially different normal vectors. Such cases are unlikely to occur, however, as they result in objectionable artifacts that are unrelated to merging.

Alternatively, two optional methods can be used individually or jointly to probabilistically determine whether the two fragments face substantially the same direction. The first method determines if the two surface normals are tilted approximately the same amount away from the viewer (that is, have roughly the same angular displacement from the z axis), and also usually eliminates fragments that are tilted nearly edge-on to the viewer. The second method determines if the two surface normals are rotated approximately the same direction in the x-y plane. Both methods are based upon information contained within the z gradients. Since the z gradients are constant across the primitive object, these methods must erroneously assume that all fragments in an object have the same normal vector. Further, because they cannot compute an actual angular displacement between two normal vectors, these probabilistic tests will also cause many undesirable don't-merge outcomes for fragments that are nearly facing the observer. Some implementations might therefore forgo these tests, and accept the consequent increase in visual artifacts, in order to maintain a high degree of efficiency.

The depth gradients are specified for each of the x and y screen coordinates. In this description, a z gradient of the depth value Z of a fragment f in the x direction will be referred to as $z_x^f$; and a z gradient of the depth value Z of the fragment f in the y direction will be referred to as $z_y^f$. The notation $\|(z_x^f, z_y^f)\|$ represents the length of the vector $(z_x^f, z_y^f)$; and $(x_c^f, y_c^f)$ refers to an approximation to the coordinates of the fragment's centroid.

In a first method, the two fragments are determined to tilt approximately the same amount away from the viewer when the ratio of the lengths of the gradients of the two fragments is between 1/n and n, for a relatively small constant n. In particular, two fragments, fragment one and fragment two, tilt approximately the same amount when:

$$\max(\|(z_x^1, z_y^1)\|, \|(z_x^2, z_y^2)\|) \leq n \cdot \min(\|(z_x^1, z_y^1)\|, \|(z_x^2, z_y^2)\|).$$

In other words, the two fragments, fragment one and fragment two, tilt approximately the same amount when:

$$\frac{\max(\|(z_x^1, z_y^1)\|, \|(z_x^2, z_y^2)\|)}{\min(\|(z_x^1, z_y^1)\|, \|(z_x^2, z_y^2)\|)} \leq n$$

To simplify the implementation, we need not compute the lengths of the vectors, which involves a square root, but can instead square both sides of the equation:

$$\max(z_x^1 \ast z_x^1 + z_y^1 \ast z_y^1, z_x^2 \ast z_x^2 + z_y^2 \ast z_y^2) <= n^2 \ast \min(z_x^1 \ast z_x^1 + z_y^1 \ast z_y^1, z_x^2 \ast z_x^2 + z_y^2 \ast z_y^2)$$

where "*" represents the multiplication operation.

Because we don't know the scale applied to Z values, we cannot compute the exact angle that a fragment is tilted away from the viewer. Instead, this test computes the ratio of the tangents of the surface normals, as measured from the z axis (which is perpendicular to the screen's x-y plane). If one of the surfaces is nearly parallel with the screen (that is, viewed face on), the minimum gradient length will be quite small, yielding a very high ratio, which can cause an undesired don't-merge outcome. If one of the surfaces is nearly perpendicular to the screen (that is, viewed edge on), the maximum gradient will be very large, again yielding a very high ratio. In this case, the don't-merge outcome is desirable, as the previously described Z projection of a nearly edge on fragment may span a huge range of Z values. Between these two extremes, the ratio provides a reasonable approximation to the angular displacement between the two surfaces. Choosing an appropriate value for n is difficult: too small a value will cause many undesired don't-merge outcomes, reducing the efficiency of the merge buffer. Too large a value will cause many undesired merge outcomes for nearly edge-on fragments. In a preferred embodiment, n might be somewhere between 2 and 4, but one of ordinary skill in the art will recognize that any suitable value could be chosen in accordance with the principles of the present invention.

In a second method, the two fragments are determined to face approximately the same direction when the angle between the vectors defined by the gradients in the (x, y) plane is small. From trigonometry, we know that the cosine of the angle between the two vectors is the dot product of the vectors divided by their lengths:

$$\cos(\text{rotation}) = ((z_x^1, z_y^1) \cdot (z_x^2, z_y^2))/(\|(z_x^1, z_y^1)\| \|(z_x^2, z_y^2)\|) = (z_x^1 z_x^2 + z_y^1 z_y^2)/(\|(z_x^1, z_y^1)\| \|(z_x^2, z_y^2)\|)$$

There is no way to substantially simplify the computation here. Either the actual lengths must be computed with square roots, or if both sides of the equation are squared we end up with lots of multiplies. We thus also observe from trigonometry that we can compute the sine of the angle between two vectors using the cross product:

$$\sin(\text{rotation}) = ((z_x^1, z_y^1) \times (z_x^2, z_y^2))/(\|(z_x^1, z_y^1)\| \|(z_x^2, z_y^2)\|) = (z_x^1 z_y^2 - z_y^1 z_x^2)/(\|(z_x^1, z_y^1)\| \|(z_x^2, z_y^2)\|)$$

And then further, we can eliminate the lengths of the vectors:

$$\tan(\text{rotation}) = \sin(\text{rotation})/\cos(\text{rotation}) = ((z_x^1, z_y^1) \times (z_x^2, z_y^2))/((z_x^1, z_y^1) \cdot (z_x^2, z_y^2)) = (z_x^1 z_y^2 - z_y^1 z_x^2)/(z_x^1 z_x^2 + z_y^1 z_y^2)$$

We first test to ensure that the angle between the vectors is smaller than 90° by testing that the tangent's denominator is positive. We can also replace the divide with a multiply.

A preferred alternate embodiment implements the rotation test as:

```
dot = z¹ₓ * z²ₓ + z¹_y * z²_y
if (dot <= 0) {
    generate don't-merge outcome
} else {
    cross = abs(z¹ₓ * z²_y - z¹_y * z²ₓ)
    if (cross < dot * tan(maximum rotation angle)) {
        proceed to further tests
    } else {
        generate don't-merge outcome
    }
}
```

Although this test accurately determines the angle between the normals in the x-y plane, it may still cause an undesirable don't-merge outcome. Consider one normal vector tilted 2° and rotated 0°. Consider another normal vector tilted 2° and rotated 180°. Though the true angle between these normal vectors is only 4°, the rotation test will still reject a merge.

Z Similarity Test

The fourth criterion for merging is that the two fragments have similar depth values, that is, the fragments are located in the 3D scene at a similar distance from the viewer. In one embodiment, depth similarity is measured by determining the difference between the fragments' depth values. When the difference exceeds a predetermined maximum, the fragments are not sufficiently similar for merging. Otherwise, when the difference does not exceed the predetermined maximum, the fragments' depth values are sufficiently similar for merging.

Basing the comparison on the magnitude of depth values alone can cause problems because the depth values may not be uniformly distributed. In other words, the magnitude of the depth values is not fixed but relative. For example, if two fragments have depth values that differ by one hundred units, whether the fragments are close to each other in the scene depends on how the depth values were assigned to all objects in the scene. In some applications, a depth value difference of one hundred units may indicate that the objects are far apart, while in other applications a difference of ten thousand units may indicate that the objects are close together.

Therefore, the present invention measures depth similarity using the rate at which the depth values change across each of the fragments. Two exemplary methods are used to determine whether the depth values of the fragments are sufficiently similar. Each method uses the depth gradients to extrapolate (project) the Z value at the first fragment's centroid toward the second fragment, then tests to see if the second fragment's Z value at its centroid is between the first fragment's Z value and its projected Z value.

In the simplest method, the projection of one fragment towards the other is determined using the product of the sum of the gradients and the distance between the fragment centroids as follows:

$$\text{projection} = (x^2_c - x^1_c)*(z^1_x + z^2_x) + (y^2_c - y^1_c)*(z^1_y + z^2_y)$$

To determine whether the depth-similarity requirement is met, the value of the projection is added to the first of the two fragments' depth values. If the second fragment's depth value falls between the first fragment's depth value and the sum of the first fragment's depth value and the projection, then the depths of these two fragments are deemed sufficiently close to merge. An exemplary pseudo-code implementation of this determination is as follows:

```
projection = (x²_c - x¹_c)*(z¹ₓ + z²ₓ) + (y²_c - y¹_c)*(z¹_y + z²_y)
if (projection < 0){
    if((Z¹ > Z²) AND (Z¹ + projection < Z²)) {
        // (fragment 1 is further away than fragment 2) AND
        // (projecting fragment 1 onto fragment 2 causes fragment
        // 1 to be closer than fragment 2)
        // depth similarity requirement met
    }
} else if ((Z¹ <= Z²) AND (Z¹ + projection >= Z²)) {
    // (fragment 1 is closer than fragment 2) AND
    // (projecting fragment 1 onto fragment 2 causes fragment 1 to
    // be further away than fragment 2)
    // depth similarity requirement met
    }
} else {
    // depth similarity requirement not met//
}
```

An alternate representation more suitable for hardware implementation is as follows:

```
projection = (x²_c - x¹_c)*(z¹ₓ + z²ₓ) + (y²_c - y¹_c)*(z¹_y + z²_y)
if (sign(Z² - Z¹) = sign(projection) AND
    sign(Z¹ + projection - Z²) = sign(projection)) {
    // depth similarity requirement met
}
```

Figure 20:
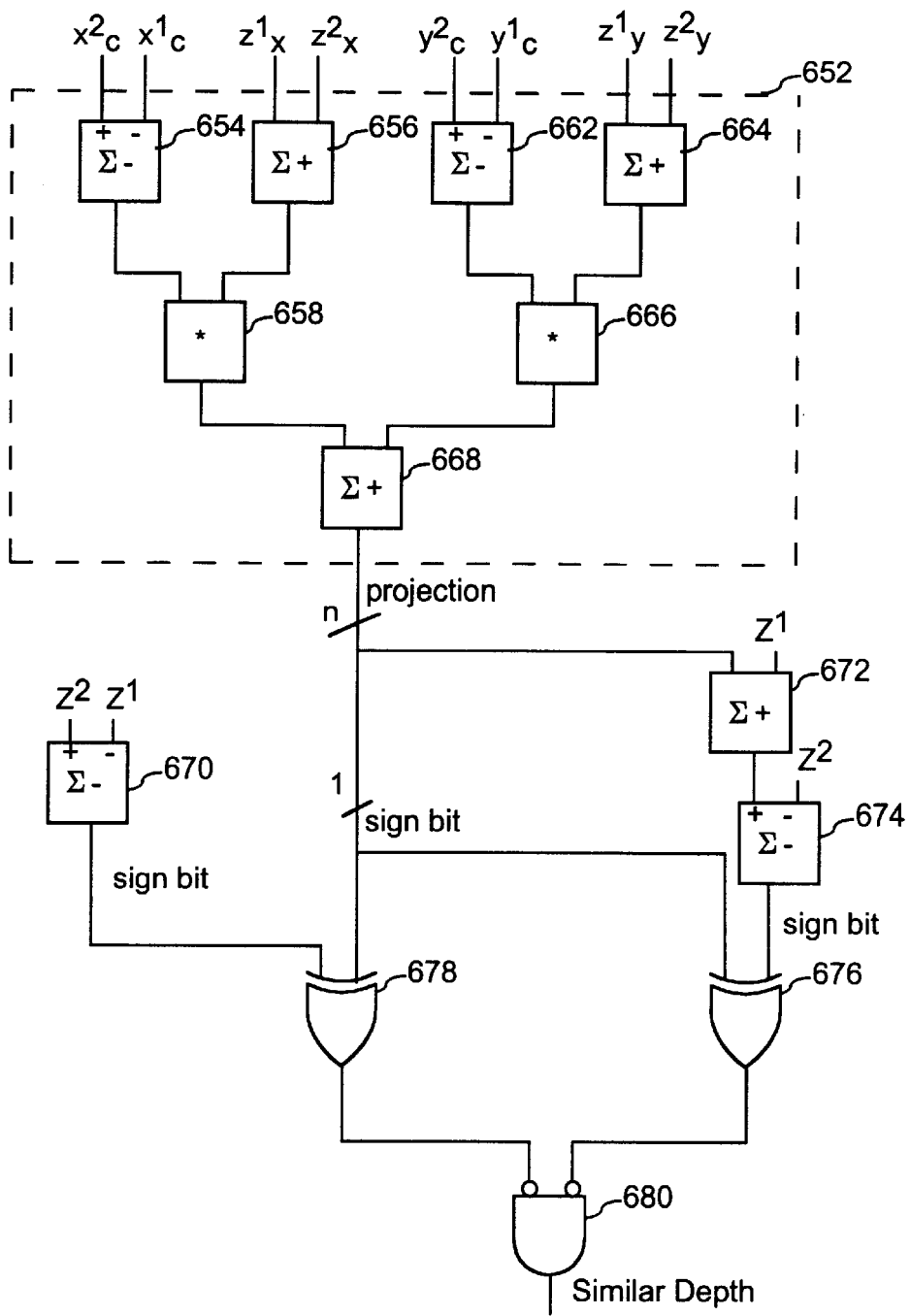
FIG. 20 is an exemplary hardware implementation of the Z projection test of the depth comparison circuit of FIG. 11.

FIG. 20 shows an exemplary hardware implementation of a portion of the pseudo-code above. A projection block 652 determines the value of projection. For the values in the horizontal, x, direction, a first subtractor 654 determines the difference between $x^2_c$ and $x^1_c$ and a first adder 656 adds $z^1_x$ and $z^2_x$. A first multiplier 658 multiplies the output of the subtractor 654 and the adder 656. Similarly, for the values in the vertical, y, direction, a second subtractor 662 determines the difference between $y^2_c$ and $y^1_c$ and a second adder 664 adds $z^1_y$ and $z^2_y$. A second multiplier 666 multiplies the output of the subtractor 662 and the adder 664. A third adder 668 sums the output of the first and second multipliers, 658, 666, respectively, to generate a value for projection.

A third subtractor 670 subtracts $Z^1$ from $Z^2$ and a sign bit is output to form the term, sign($Z^2$-$Z^1$) described above. A fourth adder 672 adds the value of projection to $Z^1$ and a fourth subtractor 674 subtracts $Z^2$ from that value. A first exclusive-or (XOR) gate 676 generates the exclusive-or of the sign bit of the projection value with the sign bit of the value output by the subtractor 674. A second XOR gate 678 generates the exclusive-or of the sign bit of the projection value with the sign bit of the value output by the subtractor 670. An AND gate 680 generates a signal indicating that the depths of the fragments are sufficiently similar by performing an AND operation on the inverted outputs of the XOR gates 676, 678.

This method of testing depth similarity may generate a don't-merge outcome for two fragments that are nearly face on to the observer, but which are rotated substantially around the Z axis from each other. This is due to the summing of the gradient components. This summing reduces computation, but also allows the two fragment's gradients to cancel each other out.

In an alternate embodiment, the depth values of two fragments are determined to be sufficiently similar to allow merging. This method is similar to the previous method except that the gradients are not summed together, and so two projections must be computed: one using the first fragment's gradients, the other using the second fragment's gradients. The first and second projections, respectively, are formed as follows:

$$\text{projection}_1 = (x^2_c - x^1_c) * z^1_x + (y^2_c - y^1_c) * z^1_y$$

$$\text{projection}_2 = (x^2_c - x^1_c) * z^2_x + (y^2_c - y^1_c) * z^2_y$$

The depth values of the fragments are determined to be sufficiently similar for merging if the second fragment's Z value is between the first fragment's Z value and either the sum of the first fragment's Z value and projection$_1$, or the sum of the first fragment's Z value and projection$_2$. An exemplary pseudo-code implementation of step 520 (FIG. 12) is as follows:

```
if (sign(Z² - Z¹) = sign(projection₁)
    AND sign(Z¹+projection₁-Z²) = sign(projection₁)) {
    // depth similarity requirement met
} else if (sign(Z² - Z¹)=sign(projection₂)
    AND sign(Z¹+projection₂-Z²) = sign(projection₂)) {
    // depth similarity requirement met
}
```

Although these exemplary techniques use the fragments' centroids, in an alternate embodiment, other suitable points, such as the center of the pixel, can be used instead in accordance with the principles of the present invention.

Color Similarity Determination

The fifth criterion for merging is that the two fragments have sufficiently similar color values. A number of methods for comparing colors are possible, of which possibly the simplest is to compute for the red, green, blue, and alpha (RGBA) components of color the absolute value of the difference between the value for one fragment and the value for the other fragment. In addition to the other criteria, fragments are determined to be sufficiently similar for merging if the difference between each component is within a predefined range, such as 0.03125 (1/32).

Figure 21:
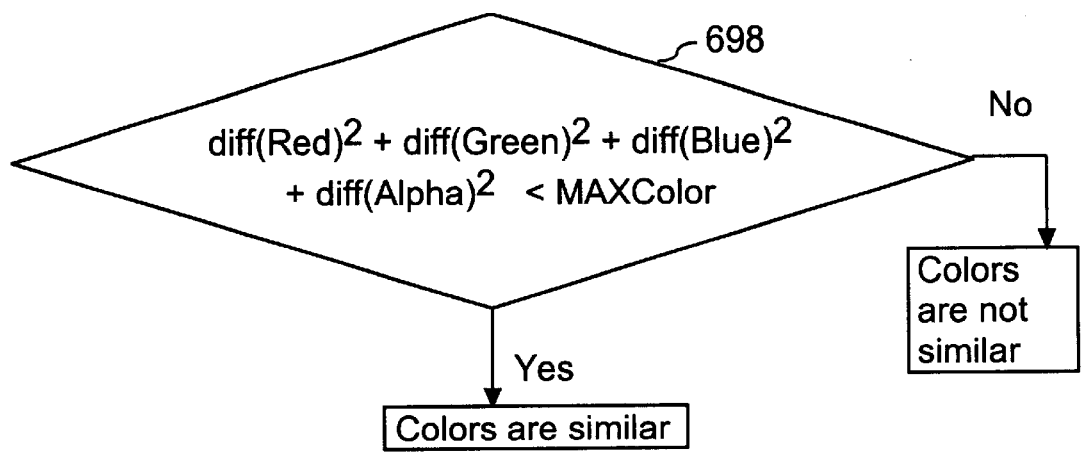
FIG. 21 is a flowchart of a method of determining color similarity in the color comparison circuit of FIG. 11.

As shown in FIG. 21, in another embodiment, the color components of the fragments are determined to be sufficiently similar for merging if the sum of the squares of the differences between each of the color components is smaller than a constant. In step 698, the color similarity requirement is met if diff(Red)$^2$+diff(Green)$^2$+diff(Blue)$^2$+diff(Alpha)$^2$ is less than a predefined constant value, such as 0.00390625 (1/256).

In contrast to determining the similarity of the depth values, the similarity of the color components is determined using a constant, rather than a gradient, because the value of each color component is uniformly distributed. Therefore, color gradients need not be stored in the fragment storage of the merge buffer.

Relaxing the Requirements for Merging

Although the embodiments discussed above presented five criteria to determine whether two fragments are sufficiently similar to be merged, in some embodiments fewer criteria could be used, with a consequent increase in artifacts. However, a large amount of circuitry might be eliminated for a small decrease in image quality. The most cost-effective implementation would avoid storing normal vectors, which are not available on many graphics accelerators. It would use a hash function on vertices that reduced the number of bits only moderately, and in particular would substantially maintain the Z coordinate information. To test if a merge is possible, it would compare primitive edges, coverage masks, and colors; it would not implement any orientation or Z similarity tests.

Merging Fragments Before Texturing

The embodiments described above place the merge buffer 380 after the texture mapping circuit 376. If merging is instead performed prior to texture mapping, fewer fragments will be texture mapped, thus increasing the performance of the texture mapping circuit 376. Merging fragments prior to texture mapping substantially increases the amount of data stored in fragment memory 482, which may require more chip real estate than improving texture mapping performance by adding more texturing units in texture mapping circuit 376. However, merging prior to texture mapping may be particularly desirable if the texture mapping circuit 376 performs several parallel or sequential texture mapping operations (multitexturing) on behalf of a fragment.

Merging pre-textured fragments requires moving the merge buffer 380 earlier in the pipeline, and augmenting the five merge criteria described above need with a further test for closeness of texture coordinates. Unfortunately, the rasterizing circuit 374 provides texture coordinates (u, v, w, q) that have not yet been transformed to take into account perspective distortion and mip-mapping level.

The most cost effective solution splits the texture-mapping circuit 376 into two parts, and inserts the merge buffer 380 between the parts. The first part performs texture mapping coordinate calculations and mip-map selection. The output of this part is then provided to the merge buffer 380, which can appropriately test texture map coordinates for closeness before allowing a merge. The merge buffer 380 in turn feeds the second part, which contains logic that accesses the texture data. By merging fragments prior to accessing the texture map, the bandwidth requirements to texture memory can be reduced, or, if a texture cache exists, the number of ports may be reduced.

Texture Map Merge Criteria

In an alternate embodiment, an additional fragment merge criteria may be based on the texture maps of the two candidate fragments. Each fragment includes a texture map coordinate tuple, and a corresponding texture map derivative tuple, where the texture map derivative tuple specifies a rate of change of each texture map coordinate with respect to x and y directions. The merge criteria include a texture map coordinate similarity requirement wherein each component of a second fragment's texture map coordinate tuple must fall between corresponding minimum and maximum values generated using the first fragment's corresponding texture map coordinate component, and the corresponding texture map derivative tuple components of at least one of the first and second fragments. The computation of minimum and maximum texture map component values is similar to the Z projection computation. The texture map coordinate similarity requirement is preferably applied to both x and y components of the texture maps of the fragments, but in other embodiments may be applied against just one of the components of the texture map coordinate tuples.

Pipeline Coherency

If two fragments with the same tag arrive closely in time at the merge buffer pipeline 394 (FIG. 6), the pipeline cannot allow the fragment data to become incoherent. For example, if a first and second fragment are currently merging in the merge buffer pipeline 394, then a third fragment with the same tag cannot be allowed to merge with the first fragment as well. (The first fragment is still visible in fragment storage 396.) To avoid this problem, the third fragment can be stalled from entering the pipeline until the first and second fragment exit the pipeline and are written back to fragment storage 396 (FIG. 6). In this case, the third fragment will attempt to merge only with the second fragment (if the first and second fragment didn't merge), or with the merged fragment (if they did merge). Alternately, the third fragment can be allowed to enter the pipeline immediately, but prohibited from merging with either the first and second fragment. In this case the merged first and second fragments must be marked "non-mergable" when they are written to the fragment storage 396.

Similarly, fragments that are about to be ejected from a nearly full fragment storage 396 must not be allowed to enter the merge buffer pipeline 394. If the pipeline is nearly full, then the oldest fragment blocks must be ejected to make room for new blocks exiting from the merge buffer pipeline. However, if one of these oldest blocks is also in the merge buffer pipeline in order to merge with a recent block, the old block cannot be ejected until it has emerged (in an updated form) from the pipeline. This results in a deadlock, where the pipeline cannot write a block to the fragment storage, and the fragment storage cannot write a block to the output queue 392. A simple solution to this problem is to prohibit the oldest few blocks in a nearly full fragment storage from matching the tag of a new block entering the pipeline.

Finally, there may be times when an application may wish to disable merging. In one implementation, if a mode bit is set to disable merging, all "mergable" bits in fragment storage 396 are set to "not mergable."

Other Merge Buffer Organizations

The invention has been described implementing the fragment storage as a queue. The performance of the merge buffer as measured in the percentage of possible merges actually effected may be increased by using a cache, with an associated increase in implementation complexity and cost. One functional difference between a cache implementation and a queue is that two blocks F and G of fragments with different tags may be ejected from the cache in an order that is different from the order in which they were generated. In contrast, these blocks are ejected from the queue in generation order. A second functional difference is that block F may be written around the cache should it be unlikely to merge in the future and should there be no other fragment in the cache with the same tag. In so doing, the entries in the cache could be reserved for fragments that are more likely to merge, and hence, a higher rate of merging may occur. A third functional difference is that when two blocks N and E are merged/copied into a single block, if a queue is used, the entry that used to store block E will now contain only invalid fragments, and this entry cannot be reused until the head pointer passes it. In contrast, with a cache, the entry could be reused sooner, and thus, a higher rate of merging may occur.

In both queue-based and cache-based implementations, the fragments corresponding to a given pixel are used to update that pixel in the order that the fragments were generated. Our preferred embodiment using a queue ensures that this ordering is maintained by allowing a new fragment to merge with only the most-recently generated fragment for the same pixel. A cache-based implementation can most simply meet this requirement by: (1) allowing only one copy of a fragment with a given tag to be in the cache at a time, and (2) ejecting the block from the cache before writing a new block with the same tag either into the cache or around the cache.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A graphics pipeline comprising:
   a rasterizer circuit that generates fragments for an image, the image having multiple surfaces, each surface tessellated into primitive objects; the image including a pixel having associated therewith a first and a second fragment; the first fragment being generated by the rasterizer circuit and having associated therewith an object comprising a respective primitive object of said primitive objects; and the second fragment being selected from a group consisting of a fragment generated by the rasterizer circuit and having associated therewith an object comprising a respective primitive object of said primitive objects, and a combination of a plurality of fragments generated by the rasterizer circuit and having associated therewith an object comprising a union of a plurality of respective primitive objects of said primitive objects;
   a merge buffer that combines the first fragment with the second fragment to create a new merged fragment that replaces the first and second fragment when predefined merge criteria are met, the predefined merge criteria include criteria that probabilistically establish that the first fragment's associated object is adjacent to the second fragment's associated object, that the first and second fragments are from a common tessellated surface of the multiple surfaces, and that the first and second fragments are sufficiently similar to avoid visually objectionable artifacts when the first and second fragments are merged; and
   a frame buffer that receives fragments from the merge buffer, the frame buffer storing fragments and outputting the fragments combined into pixels to a display.

2. The graphics pipeline of claim 1 wherein the first and second fragments each include an ordered set of three-dimensional vertex triplets (x, y, z) specifying a subset of vertex locations for the fragment's associated object, and information specifying whether each edge of a subset of edges of the fragment's associated object bisects a rectangular block associated with the fragment; each edge in the subset of edges corresponding to the (x, y) components of a pair of the vertex triplets;
   the predefined merge criteria include requirements that two vertex locations of the first fragment match two vertex locations of the second fragment, that the subsets of edges of the first and second fragments both include an edge corresponding to the (x, y) components of the two matched vertex locations, and that the edge between the (x, y) components of the two matched vertex locations bisects the rectangular blocks associated with the first and second fragments.

3. The graphics pipeline of claim 1 wherein the first and second fragments each include a coverage mask indicating a set of sample points for the pixel associated with the fragment, that are inside the object associated with the fragment;

the predefined merge criteria include a requirement that the set of sample points indicated by the coverage mask of the first fragment and the set of sample points indicated by the coverage mask of the second fragment do not intersect.

4. The graphics pipeline of claim 1 wherein the first and second fragments each include a three-dimensional normal vector, indicating a normal direction associated with the fragment; the first fragment's normal vector and second fragment's normal vector having an angle therebetween;

the predefined merge criteria include a requirement that the angle between the first fragment's normal vector and second fragment's normal vector is smaller than a predefined maximum angle.

5. The graphics pipeline of claim 1 wherein the first and second fragments each include a z component of a normal vector, each normal vector indicating a normal direction associated with the fragment;

the predefined merge criteria include a requirement that absolute values of the z component of the first and second fragment's normal vectors are both larger than a predefined minimum value.

6. The graphics pipeline of claim 1 wherein the first and second fragments each include the sign of a z component of a normal vector, each normal vector indicating a normal direction associated with the fragment;

the predefined merge criteria include a requirement that the signs of the z components of the first and second fragment's normal vectors indicate that both z components are non-negative, or that both are negative.

7. The graphics pipeline of claim 1 wherein the first and second fragments each include shading information;

the predefined merge criteria include a requirement that the shading information of both the first and second fragments indicates curved surface shading.

8. The graphics pipeline of claim 1 wherein the first and second fragments each include a depth gradient vector that includes a first component, indicating a rate of change in depth value in a first direction, and second component, indicating a rate of change in depth value in a second direction;

the predefined merge criteria include a requirement that value corresponding to a predefined function of the first and second components of the Z gradient vectors of first and second fragments be larger than a predefined minimum value and smaller than a predefined maximum value.

9. The graphics pipeline of claim 1 wherein the first and second fragments each include a depth gradient vector;

the predefined merge criteria include a requirement that an angle between the depth gradient vector of the first fragment and the depth gradient vector of the second fragment be smaller than a predefined maximum angle.

10. The graphics pipeline of claim 1 wherein the first and second fragments each include a depth value and a depth gradient vector;

the predefined merge criteria include a depth similarity requirement wherein the depth value of one fragment of the first and second fragments must fall within a range of depth values generated using the depth value of the other fragment of the first and second fragments and the depth gradient vector of at least one of the first and second fragments.

11. The graphics pipeline of claim 1 wherein the first and second fragments each include a depth value and a depth gradient vector;

the predefined merge criteria include a depth similarity requirement wherein a difference between the depth values of the second and first fragments must fall within a range of difference values generated using the depth gradient vectors of the first and second fragments.

12. The graphics pipeline of claim 1 wherein the first and second fragments each include a color tuple; and the predefined merge criteria include a requirement that the color tuple of the first fragment meet predefined color similarity criteria with respect to the color tuple of the second fragment.

13. The graphics pipeline of claim 12, wherein each color tuple includes a plurality of elements, and the predefined color similarity criteria comprises a requirement that a sum of squares of differences between elements of the color tuple of the first fragment and elements of the color tuple of the second fragment be less than a predefined maximum value.

14. The graphics pipeline of claim 12, wherein each color tuple includes a plurality of elements, and the predefined color similarity criteria comprises a requirement that absolute values of the differences between elements of the color tuple of the first fragment and elements of the color tuple of the second fragment each be less than a predefined maximum value.

15. The graphics pipeline of claim 1, wherein the first and second fragments each include a color tuple; and the predefined merge criteria include a requirement that absolute values of the differences between elements of the color tuple of the first fragment and elements of the color tuple of the second fragment each be less than a predefined maximum color element difference value.

16. The graphics pipeline of claim 1 wherein the first and second fragments each include a texture map coordinate tuple, and corresponding texture map derivative tuples, where the texture map derivative tuples specify a rate of change of each texture map coordinate with respect to x and y directions; and the predefined merge criteria include a texture map coordinate similarity requirement wherein a component of the texture map coordinate tuple of one fragment of the first and second fragments must fall between within a range of values generated using the corresponding component of the texture map tuple of the other fragment of the first and second fragments and the texture map derivative tuple of at least one of the first and second fragments.

17. The graphics pipeline of claim 1 wherein the rasterizer circuit generates a likely-to-merge bit indicating whether a rectangular block associated with a fragment is bisected by a most recent internal edge of a sequence of adjacent objects, wherein said most recent internal edge would be shared by a next adjacent primitive object in the sequence of adjacent primitive objects, if said sequence includes said next adjacent primitive object.

18. The graphics pipeline of claim 17 wherein the merge buffer contains a memory for storing a set of fragments to merge with new fragments, each stored fragment being marked as one of likely-to-merge and not-likely-to-merge; and when the merge buffer memory is full, the merge buffer preferentially keeps in the merge buffer memory fragments marked as likely-to-merge, and preferentially replaces fragments marked as not-likely-to-merge with newer fragments.

19. The graphics pipeline of claim 17 wherein the merge buffer contains a memory for storing a set of fragments to merge with new fragments, each stored fragment being stored in a block within the merge buffer, each block having capacity to store more than one fragment and being marked as one of likely-to-merge and not-likely-to-merge; and when the merge buffer memory is full, the merge buffer preferentially keeps in the merge buffer memory blocks marked as likely-to-merge, and preferentially replaces blocks marked as not-likely-to-merge with blocks containing newer fragments.

20. The graphics pipeline of claim 19 wherein the merge buffer is configured to replace the first fragment with the new merged fragment when the block associated with the first fragment is marked likely-to-merge and to otherwise replace the second fragment with the new merged fragment.

21. The graphics pipeline of claim 1 wherein the merge buffer includes a queue for storing a set of fragments to merge with new fragments.

22. The graphics pipeline of claim 1 wherein the merge buffer includes a cache for storing a set of fragments to merge with new fragments.

23. The graphics pipeline of claim 1 wherein the merge buffer contains a memory for storing a set of fragments to potentially merge with new fragments, each stored fragment being stored in a block within the merge buffer, each block having capacity to store more than one fragment and storing a plurality of parameters applicable to all fragments stored within the block.

24. The graphics pipeline of claim 1 wherein the merge buffer includes an evaluation stage circuit that performs computations on the first and second fragments to determine whether the predefined merge criteria are met, and a fragment merging stage circuit for conditionally merging the first and second fragments to generate the new merged fragment in accordance with an outcome generated by the evaluation stage circuit, wherein the fragment merging stage circuit is configured to receive at least one value, other than said outcome, computed by the evaluation stage circuit and to utilize at least one received value as an input to a computation for computing a characteristic of the new merged fragment.

25. The graphics pipeline of claim 1 wherein the first and second fragments each include a depth gradient vector that includes a first component, indicating a rate of change in depth value in a first direction, and second component, indicating a rate of change in depth value in a second direction; and the merge buffer includes an evaluation stage circuit that performs computations on the first and second fragments to determine whether the predefined merge criteria are met, and a fragment merging stage circuit for conditionally merging the first and second fragments to generate the new merged fragment in accordance with an outcome generated by the evaluation stage circuit, wherein the fragment merging stage circuit is configured to generate a depth gradient vector for the new merged fragment by selecting whichever of the depth gradient vectors of the first and second fragments has a smaller length and using the selected depth gradient vector as the depth gradient vector of the new merged fragment.

26. The graphics pipeline of claim 1 further comprising a texture mapping circuit configured to receive fragments from the rasterizer circuit, apply a texture map to the fragments, and outputting the fragments to the merge buffer.

27. Image processing apparatus comprising:

fragment storage storing fragment tuples, each stored fragment tuple being associated with a fragment in a pixel of an image having a plurality of pixels, the image having multiple surfaces, each surface tessellated into primitive objects; each fragment tuple including a color value and a depth value;

a merge pipeline processing circuit for processing a new fragment tuple representing a fragment to be added to the image, the pipeline processing circuit including a sequence of pipeline stage circuits, including:

a tag comparison stage circuit for identifying a potentially mergable fragment tuple, comprising one of the fragment tuples in the fragment storage; the new fragment tuple having associated therewith a first object comprising a respective primitive object of said primitive objects, and the potentially mergable fragment tuple having associated therewith a second object selected from a group consisting of a respective primitive object of said primitive objects and a union of a plurality of respective primitive objects of said primitive objects;

an evaluation stage circuit for generating an outcome based on whether predefined merge criteria are met, the predefined merge criteria include criteria that probabilistically establish that the object associated with the new fragment tuple is adjacent to the object associated with the potentially mergable fragment tuple, that the new fragment tuple and potentially mergable fragment tuple are associated with fragments from a common tessellated surface of the multiple surfaces, and that the first and second fragments are sufficiently similar to avoid visually objectionable artifacts when the first and second fragments are merged;

a fragment merging stage circuit for merging the color values and depth values of the new fragment tuple and the potentially mergable fragment tuple to generate a merged fragment tuple based on the outcome of the evaluation stage; and an update fragment storage stage circuit for storing the merged fragment tuple in the fragment storage if the predefined merge criteria are met, and for storing the new fragment tuple in the fragment storage if the predefined merge criteria are not met.

28. The image processing apparatus of claim 27 wherein each of the fragment tuples in the fragment storage has associated therewith an x-y position tag; and the tag comparison stage circuit is configured to identify the potentially mergable fragment tuple by comparing an x-y position tag of the new fragment tuple with the x-y position tags of the fragment tuples in the fragment storage.

29. The image processing apparatus of claim 27 wherein the new fragment tuple and the potentially mergable fragment tuple each include a depth gradient vector; and the evaluation stage circuit generates the outcome based on the color values, the depth values and the depth gradient vectors of the new fragment tuple and the potentially mergable fragment tuple.

30. The image processing apparatus of claim 27, wherein the new fragment tuple and the potentially mergable fragment tuple each include an ordered set of three-dimensional vertex triplets (x, y, z) specifying a subset of vertex locations for the fragment tuple's associated object, and information specifying whether each edge of a subset of edges of the fragment's associated object bisects a rectangular block associated with the fragment tuple; each edge in the subset of edges corresponding to the (x, y) components of a pair of the vertex triplets; and the predefined merge criteria include requirements that two vertex locations of the new fragment tuple match two vertex locations of the potentially mergable fragment tuple, that the subsets of edges of the first and second fragments both include an edge corresponding to the (x, y) components of the two matched vertex locations, and that the edge between the (x, y) components of the two matched vertex locations bisects the rectangular blocks associated with the new fragment tuple and the potentially mergable fragment tuple.

31. The image processing apparatus of claim 27 wherein the new fragment tuple and the potentially mergable fragment tuple each include a coverage mask indicating a set of sample points for the pixel associated with the fragment, that are inside the object associated with the fragment; and the predefined merge criteria include a requirement that the set of sample points indicated by the coverage mask of the new fragment tuple and the set of sample points indicated by the coverage mask of the potentially mergable fragment tuple do not intersect.

32. The image processing apparatus of claim 27 wherein the new fragment tuple and the potentially mergable fragment tuple each include a three-dimensional normal vector, indicating a normal direction associated with the fragment; the new fragment tuple's normal vector and potentially mergable fragment tuple's normal vector having an angle therebetween; and the predefined merge criteria include a requirement that the angle between the new fragment tuple's normal vector and the potentially mergable fragment tuple's normal vector is smaller than a predefined maximum angle.

33. The image processing apparatus of claim 27 wherein the new fragment tuple and the potentially mergable fragment tuple each include a z component of a normal vector, each normal vector indicating a normal direction associated with the fragment; and the predefined merge criteria include a requirement that absolute values of the z component of the new and potential mergable fragment tuples' normal vectors are both larger than a predefined minimum value.

34. The image processing apparatus of claim 27 wherein the new fragment tuple and the potentially mergable fragment tuple each include the sign of a z component of a normal vector, each normal vector indicating a normal direction associated with the fragment;

the predefined merge criteria include a requirement that the signs of the z components of the new and potential mergable fragment tuples' normal vectors indicate that both z components are non-negative, or that both are negative.

35. The image processing apparatus of claim 27 wherein the new fragment tuple and the potentially mergable fragment tuple each include shading information; and the predefined merge criteria include a requirement that the shading information of both the new fragment tuple and the potentially mergable fragment tuple indicates curved surface shading.

36. The image processing apparatus of claim 27 wherein the new fragment tuple and the potentially mergable fragment tuple each include a depth gradient vector that includes a first component, indicating a rate of change in depth value in a first direction, and second component, indicating a rate of change in depth value in a second direction; and the predefined merge criteria include a requirement that value corresponding to a predefined function of the first and second components of the Z gradient vectors of first and second fragments be larger than a predefined minimum value and smaller than a predefined maximum value.

37. The image processing apparatus of claim 27 wherein the new fragment tuple and the potentially mergable fragment tuple each include a depth gradient vector; and the predefined merge criteria include a requirement that an angle between the depth gradient vector of the new fragment tuple and the depth gradient vector of the potentially mergable fragment tuple be smaller than a predefined maximum angle.

38. The image processing apparatus of claim 27 wherein the new fragment tuple and the potentially mergable fragment tuple each include a depth gradient vector; and the predefined merge criteria include a depth similarity requirement wherein the depth value of one fragment of the new and potentially mergable fragment tuples must fall within a range of depth values generated using the depth value of the other fragment of the new and potentially mergable fragment tuples and the depth gradient vector of at least one of the new and potentially mergable fragment tuples.

39. The image processing apparatus of claim 27 wherein the new fragment tuple and the potentially mergable fragment tuple each include a depth gradient vector; and the predefined merge criteria include a depth similarity requirement wherein a difference between the depth values of the potentially mergable and new fragment tuples must fall within a range of difference values generated using the depth gradient vectors of the new and potentially mergable fragment tuples.

40. The image processing apparatus of claim 27 wherein the new fragment tuple and the potentially mergable fragment tuple each include a color tuple; and the predefined merge criteria include a requirement that the color tuple of the new fragment tuple meet predefined color similarity criteria with respect to the color tuple of the potentially mergable fragment tuple.

41. The image processing apparatus of claim 40, wherein each color tuple includes a plurality of elements, and the predefined color similarity criteria comprises a requirement that a sum of squares of differences between elements of the color tuple of the new fragment tuple and elements of the color tuple of the potentially mergable fragment tuple be less than a predefined maximum value.

42. The image processing apparatus of claim 40, wherein each color tuple includes a plurality of elements, and the predefined color similarity criteria comprises a requirement that absolute values of the differences between elements of the color tuple of the new fragment tuple and elements of the color tuple of the potentially mergable fragment tuple each be less than a predefined maximum value.

43. The image processing apparatus of claim 27, wherein
the new fragment tuple and the potentially mergable fragment tuple each include a color tuple; and
the predefined merge criteria include a requirement that absolute values of the differences between elements of the color tuple of the new fragment tuple and elements of the color tuple of the potentially mergable fragment tuple each be less than a predefined maximum color element difference value.

44. The image processing apparatus of claim 27, wherein
the fragment storage includes a plurality of blocks for storing the stored fragment tuples, each block having capacity to store more than one fragment tuple and storing a plurality of parameters applicable to all fragments tuples stored within the block.

45. The image processing apparatus of claim 27, wherein the evaluation stage circuit is configured to perform computations on the new and potentially mergable fragment tuples to determine whether the predefined merge criteria are met, and the fragment merging stage circuit is configured to receive at least one value, other than said outcome, computed by the evaluation stage circuit and to utilize at least one received value as an input to a computation for computing a characteristic of the merged fragment tuple.

46. The image processing apparatus of claim 27, wherein
the new and potentially mergable fragment tuples each include a depth gradient vector that includes a first component, indicating a rate of change in depth value in a first direction, and second component, indicating a rate of change in depth value in a second direction; and
the fragment merging stage circuit is configured to conditionally generate a depth gradient vector for the merged fragment tuple by selecting whichever of the depth gradient vectors of the new and potentially mergable fragment tuples has a smaller length and using the selected depth gradient vector as the depth gradient vector of the merged fragment tuple.

47. A method of rendering an image, the method comprising:
generating fragments for the image, the image having multiple surfaces, each surface tessellated into primitive objects; the image including a pixel having associated therewith a first and a second fragment; the first fragment being one of the generated fragments and having associated therewith an object comprising a respective primitive object of said primitive objects, and the second fragment being selected from a group consisting of a generated fragment and having associated therewith an object comprising a respective primitive object of said primitive objects, and a combination of a plurality of generated fragments and having associated therewith an object comprising a union of a plurality of respective primitive objects of said primitive objects;
conditionally merging the first fragment with the second fragment to create a new merged fragment that replaces the first and second fragment when predefined merge criteria are met, the predefined merge criteria include criteria that probabilistically establish that the first fragment's associated object is adjacent to the second fragment's associated object, that the first and second fragments are from a common tessellated surface of the multiple surfaces, and that the first and second fragments are sufficiently similar to avoid visually objectionable artifacts when the first and second fragments are merged; and
storing in a frame buffer fragments from among the generated fragments and the new merged fragment, combining the fragments into pixels and outputting the pixels to a display.

48. A method of rendering an image, the image having a plurality of pixels, the image furthermore having multiple surfaces, each surface tessellated into primitive objects; the method comprising:
storing fragment tuples, each stored fragment tuple being associated with a fragment in a pixel of the image, each fragment tuple including a color value and a depth value;
processing a new fragment tuple representing a fragment to be added to a particular pixel of the plurality of pixels, the new fragment tuple having a color value and a depth value;
the processing of the new fragment tuple including:
comparing the new fragment tuple and a selected fragment tuple of the stored fragment tuples to generate a merge outcome based on whether predefined merge criteria are met, the new fragment having associated therewith a first object comprising a respective primitive object of said primitive objects, and the selected fragment having associated therewith a second object selected from a group consisting of a respective primitive object of said primitive objects and a union of a plurality of respective primitive objects of said primitive objects;
the predefined merge criteria include criteria that probabilistically establish that the first object, associated with the new fragment tuple, is adjacent to the second object, associated with the selected fragment tuple, that the new fragment tuple and selected fragment tuple are associated with fragments from a common tessellated surface of the multiple surfaces, and that the first and second fragments are sufficiently similar to avoid visually objectionable artifacts when the first and second fragments are merged; and
merging the new fragment tuple with the selected fragment tuple to produce a merged fragment tuple when the merge outcome has a predefined value.

49. The method of claim 48 wherein
each of the stored fragment tuples has associated therewith an x-y position tag; and
the selected fragment tuple is selected by comparing an x-y position tag of the new fragment tuple with the x-y position tags of the stored fragment tuples.

50. The method of claim 48 wherein
the new fragment tuple and the selected fragment tuple each include a depth gradient vector; and
the merge outcome is based on the color values, the depth values and the depth gradient vectors of the new fragment tuple and the selected fragment tuple.

51. The method of claim 48 wherein
the new fragment tuple and the selected fragment tuple each include an ordered set of three-dimensional vertex triplets (x, y, z) specifying a subset of vertex locations for the fragment tuple's associated object, and information specifying whether each edge of a subset of edges of the fragment tuple's associated object bisects a rectangular block associated with the fragment tuple; each edge in the subset of edges corresponding to the (x, y) components of a pair of the vertex triplets;

the predefined merge criteria include requirements that two vertex locations of the new fragment tuple match two vertex locations of the selected fragment tuple, that the subsets of edges of the first and second fragments both include an edge corresponding to the (x, y) components of the two matched vertex locations, and that the edge between the (x, y) components of the two matched vertex locations bisects the rectangular blocks associated with the new fragment tuple and the selected fragment tuple.

52. The method of claim 48 wherein
the new fragment tuple and the selected fragment tuple each include a coverage mask indicating a set of sample points for the pixel associated with the fragment, that are inside the object associated with the fragment; and
the predefined merge criteria include a requirement that the set of sample points indicated by the coverage mask of the new fragment tuple and the set of sample points indicated by the coverage mask of the selected fragment tuple do not intersect.

53. The method of claim 48 wherein
the new fragment tuple and the selected fragment tuple each include a three-dimensional normal vector, indicating a normal direction associated with the fragment; the new fragment tuple's normal vector and selected fragment tuple's normal vector having an angle therebetween;
the predefined merge criteria include a requirement that the angle between the new fragment tuple's normal vector and the selected fragment tuple's normal vector is smaller than a predefined maximum angle.

54. The method of claim 48 wherein
the new fragment tuple and the selected fragment tuple each include a z component of a normal vector, each normal vector indicating a normal direction associated with the fragment; and
the predefined merge criteria include a requirement that absolute values of the z component of the new and selected fragment tuples' normal vectors are both larger than a predefined minimum value.

55. The method of claim 48 wherein
the new fragment tuple and the selected fragment tuple each include the sign of a z component of a normal vector, each normal vector indicating a normal direction associated with the fragment; and
the predefined merge criteria include a requirement that the signs of the z components of the new and selected fragment tuples' normal vectors indicate that both z components are non-negative, or that both are negative.

56. The method of claim 48 wherein
the new fragment tuple and the selected fragment tuple each include shading information; and
the predefined merge criteria include a requirement that the shading information of both the new fragment tuple and the selected fragment tuple indicates curved surface shading.

57. The method of claim 48 wherein
the new fragment tuple and the selected fragment tuple each include a depth gradient vector that includes a first component, indicating a rate of change in depth value in a first direction, and second component, indicating a rate of change in depth value in a second direction; and
the predefined merge criteria include a requirement that value corresponding to a predefined function of the first and second components of the Z gradient vectors of first and second fragments be larger than a predefined minimum value and smaller than a predefined maximum value.

58. The method of claim 48 wherein
the new fragment tuple and the selected fragment tuple each include a depth gradient vector; and
the predefined merge criteria include a requirement that an angle between the depth gradient vector of the new fragment tuple and the depth gradient vector of the selected fragment tuple be smaller than a predefined maximum angle.

59. The method of claim 48 wherein
the new fragment tuple and the selected fragment tuple each include a depth gradient vector; and
the predefined merge criteria include a depth similarity requirement wherein the depth value of one fragment of the new and selected fragment tuples must fall within a range of depth values generated using the depth value of the other fragment of the new and selected fragment tuples and the depth gradient vector of at least one of the new and selected fragment tuples.

60. The method of claim 48 wherein
the new fragment tuple and the selected fragment tuple each include a depth gradient vector; and
the predefined merge criteria include a depth similarity requirement wherein a difference between the depth values of the selected and new fragment tuples must fall within a range of difference values generated using the depth gradient vectors of the new and selected fragment tuples.

61. The method of claim 48 wherein
the new fragment tuple and the selected fragment tuple each include a color tuple; and
the predefined merge criteria include a requirement that the color tuple of the new fragment tuple meet predefined color similarity criteria with respect to the color tuple of the selected fragment tuple.

62. The method of claim 61, wherein each color tuple includes a plurality of elements, and the predefined color similarity criteria comprises a requirement that a sum of squares of differences between elements of the color tuple of the new fragment tuple and elements of the color tuple of the selected fragment tuple be less than a predefined maximum value.

63. The method of claim 61, wherein each color tuple includes a plurality of elements, and the predefined color similarity criteria comprises a requirement that absolute values of the differences between elements of the color tuple of the new fragment tuple and elements of the color tuple of the selected fragment tuple each be less than a predefined maximum value.

64. The method of claim 48, wherein
the new fragment tuple and the selected fragment tuple each include a color tuple; and
the predefined merge criteria include a requirement that absolute values of the differences between elements of the color tuple of the new fragment tuple and elements of the color tuple of the selected fragment tuple each be less than a predefined maximum color element difference value.

65. The method of claim 48, wherein
the fragment tuple storing includes storing the fragment tuples in a plurality of blocks, each block having capacity to store more than one fragment tuple and storing a plurality of parameters applicable to all fragments tuples stored within the block.

66. The method of claim 48, wherein the comparing includes performing computations on the new and selected fragment tuples to determine whether the predefined merge criteria are met, and the merging includes receiving at least one value, other than said outcome, computed during the comparing and utilizing the at least one received value as an input to a computation for computing a characteristic of the merged fragment tuple.

67. The method of claim 48, wherein the new and selected fragment tuples each include a depth gradient vector that includes a first component, indicating a rate of change in depth value in a first direction, and second component, indicating a rate of change in depth value in a second direction; and the merging conditionally generates a depth gradient vector for the merged fragment tuple by selecting whichever of the depth gradient vectors of the new and selected fragment tuples has a smaller length and using the selected depth gradient vector as the depth gradient vector of the merged fragment tuple.

68. The method of claim 48, wherein one of the new and the selected fragment tuples has associated therewith a $Z^1$ depth value, an $x^1_c$ centroid value and a $y^1_c$ centroid value, a $z^1_x$ gradient value and a $z^1_y$ gradient value, and the other fragment tuple has associated therewith a $Z^2$ depth value and an $x^2_c$ centroid value and a $y^2_c$ centroid value, a $z^2_x$ gradient value and a $z^2_y$ gradient value; and said comparing includes determining that the depth values of the new and selected fragment tuples are similar when $$\text{sign}(Z^2-Z^1)=\text{sign}((x^2_c-x^1_c)*(z^1_x+z^2_x)+(y^2_c-y^1_c)*(z^1_y+z^2_y))$$

AND $$\text{sign}(Z^1+(x^2_c-x^1_c)*(z^1_x+z^2_x)+(y^2_c-y^1_c)*(z^1_y+z^2_y)-Z^2)=\text{sign}((x^2_c-x^1_c)*(z^1_x+z^2_x)+(y^2_c-y^1_c)*(z^1_y-z^2_y)).$$

69. The method of claim 48 wherein one of the new and the selected fragment tuples has associated therewith a $Z^1$ depth value, an $x^1_c$ centroid value and a $Y^1_c$ centroid value, a $z^1_x$ gradient value and a $z^1_y$ gradient value, and the other fragment tuple has associated therewith a $Z^2$ depth value and an $x^2_c$ centroid value and a $y^2_c$ centroid value, a $z^2_x$ gradient value and a $z^2_y$ gradient value, and said comparing includes determining that the depth values of the new and selected fragment tuples are similar when $$\text{sign}(z^2-Z^1)=\text{sign}((x^2_c-x^1_c)*z^1_x+(y^2_c-y^1_c)*z^1_y)$$

AND $$\text{sign}(Z^1+(x^2_c-x^1_c)*z^1_x+(y^2_c-y^1_c)*z^1_y-Z^2)=\text{sign}((x^2_c-x^1_c)*z^1_x+(y^2_c-y^1_c)*z^1_y),$$

or when $$\text{sign}(Z^2-Z^1)=\text{sign}((x^2_c-x^1_c)*z^2_x+(y^2_c-y^1_c)*z^2_y),$$

AND $$\text{sign}(Z^1+(x^2_c-x^1_c)*z^2_x+(y^2_c-y^1_c)*z^2_y-Z^2)=\text{sign}((x^2_c-x^1_c)*z^2_x+(y^2_c-y^1_c)*z^2_y).$$

70. The method of claim 48 wherein one of the new and the selected fragment tuples has associated therewith a $z^1_x$ gradient value and a $z^1_y$ gradient value, and the other fragment tuple has associated therewith a $z^2_x$ gradient value and a $z^2_y$ gradient value, $\|(z^1_x, z^1_y)\|$ represents the length of the vector $(z^1_x, z^1_y)$, and $\|(z^2_x, z^2_y)\|$ represents the length of the vector $(z^2_x, z^2_y)$, and said comparing including determining that the selected and the new fragment tuples face in similar directions when $$\max(\|(z^1_x,z^1_y)\|,\|(z^2_x,z^2_y)\|)<=n*\min(\|(z^1_x,z^1_y)\|,\|(z^2_x,z^2_y)\|).$$

71. The method of claim 48 wherein one of the new and the selected fragment tuples has associated therewith a $z^1_x$ gradient value and a $z^1_y$ gradient value, and the other fragment tuple has associated therewith a $z^2_x$ gradient value and a $z^2_y$ gradient value, said comparing including determining that the selected and the new fragment tuples face a same direction when $$\text{sign}(z^1_x)=\text{sign}(z^2_x),$$

and $$\text{sign}(z^1_y)=\text{sign}(z^2_y).$$

* * * * *